United States Patent
Goyal et al.

(10) Patent No.: US 12,294,457 B2
(45) Date of Patent: May 6, 2025

(54) TECHNIQUES FOR STEREO ON PERIPHERAL DEVICES

(71) Applicant: QUALCOMM Incorporated, San Diego, CA (US)

(72) Inventors: Giriraj Goyal, Bangalore (IN); Nitin Raghavendra Kidiyoor, Bangalore (IN); Naveenraj Subramanian, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 18/478,141

(22) Filed: Sep. 29, 2023

(65) Prior Publication Data

US 2025/0112730 A1 Apr. 3, 2025

(51) Int. Cl.
*H04L 1/00* (2006.01)
*H04L 1/1607* (2023.01)

(52) U.S. Cl.
CPC .......... *H04L 1/0061* (2013.01); *H04L 1/1614* (2013.01); *H04L 1/1628* (2013.01)

(58) Field of Classification Search
CPC .... H04L 1/0061; H04L 1/1614; H04L 1/1628
See application file for complete search history.

(56) References Cited

U.S. PATENT DOCUMENTS

| | | | |
|---|---|---|---|
| 8,159,990 B2 * | 4/2012 | Haartsen | H04L 1/0003 370/312 |
| 10,159,105 B1 * | 12/2018 | Linsky | H04L 69/24 |
| 10,616,743 B2 * | 4/2020 | Wojcieszak | H04W 4/80 |
| 10,840,995 B1 * | 11/2020 | Luong | H04L 43/106 |
| 2017/0187635 A1 * | 6/2017 | Subasingha | H04L 43/16 |
| 2019/0327778 A1 * | 10/2019 | Morris | H04W 88/04 |
| 2020/0137699 A1 * | 4/2020 | Girardier | H04W 56/001 |
| 2020/0252993 A1 * | 8/2020 | Srivastava | H04W 36/304 |
| 2020/0329400 A1 | 10/2020 | Goyal et al. | |
| 2021/0377687 A1 * | 12/2021 | Berger | G06F 3/165 |
| 2022/0174392 A1 | 6/2022 | Jorgovanovic et al. | |

(Continued)

FOREIGN PATENT DOCUMENTS

WO    WO-2023146565 A1 *  8/2023  ......... H04L 65/4015

OTHER PUBLICATIONS

International Search Report and Written Opinion—PCT/US2024/044130—ISA/EPO—Dec. 10, 2024.

*Primary Examiner* — Albert Decady
*Assistant Examiner* — Osman M Alshack
(74) *Attorney, Agent, or Firm* — Harrity & Harrity, LLP

(57) ABSTRACT

Various aspects of the present disclosure generally relate to wireless communication. In some aspects, a first peripheral device may receive audio stream packets sniffed from an owner audio stream assigned to a second peripheral device paired with the first peripheral device. The first peripheral device may receive a synchronization message from the second peripheral device that includes an owner packet bitmap that identifies packets in the owner audio stream. The first peripheral device may identify missed packets that the first peripheral device missed from the owner audio stream, based on a result of a comparison of the owner packet bitmap and a sniffer packet bitmap that identifies sniffed audio stream packets. The first peripheral device may transmit a response message indicating the missed packets. Numerous other aspects are described.

13 Claims, 16 Drawing Sheets

(56) References Cited

U.S. PATENT DOCUMENTS

| | | | |
|---|---|---|---|
| 2022/0248333 A1* | 8/2022 | Soulier | H04W 52/0216 |
| 2022/0369022 A1* | 11/2022 | Jorgovanovic | H04R 1/1016 |
| 2023/0069230 A1* | 3/2023 | Girardier | H04S 7/30 |
| 2023/0097491 A1* | 3/2023 | Jin | H04W 48/16 370/329 |
| 2024/0121550 A1* | 4/2024 | Kumar | H04R 1/1016 |

* cited by examiner

| S No | SN | CRC Result | MIC Result | Expected Packets after the reception |
|---|---|---|---|---|
| 1 | $\bar{s}$ | Pass | Fail | If last packet CRC octets matched with CRC octets of current packet<br>    The received packet is considered as x-1<br>    Expected packets will change to :<br>        If it was flushing point of $s(x)$, then $\bar{s}(x+1)$ and $s(x+2)$<br>        Else remain $s(x)$ and $\bar{s}(x+1)$<br>Else,<br>    Packet received is considered as x+3<br>    Expected packets will change to $s(x+4)$ and $\bar{s}(x+5)$ |
| 2 | $s$ | Pass | Fail | Packet received is considered as x+2.<br>Expected packets will change to : $\bar{s}(x+3)$ and $s(x+4)$ |
| 3 | $\bar{s}$ | Pass | Pass | The packet is $\bar{s}(x+1)$.<br>Expected packets will change to : $s(x+2)$ and $\bar{s}(x+3)$ |
| 4 | $s$ | Pass | Pass | The packet is $s(x)$.<br>Expected packets will change to : $\bar{s}(x+1)$ and $s(x+2)$ |
| 5 | $s$ | Fail | - | Expected packets remain as $s(x)$ and $\bar{s}(x+1)$<br>If it was flushing point of $s(x)$, then $\bar{s}(x+1)$ and $s(x+2)$ |
| 6 | $\bar{s}$ | Fail | - | Expected packets remain as $s(x)$ and $\bar{s}(x+1)$<br>If it was flushing point of $s(x)$, then $\bar{s}(x+1)$ and $s(x+2)$ |

FIG. 13

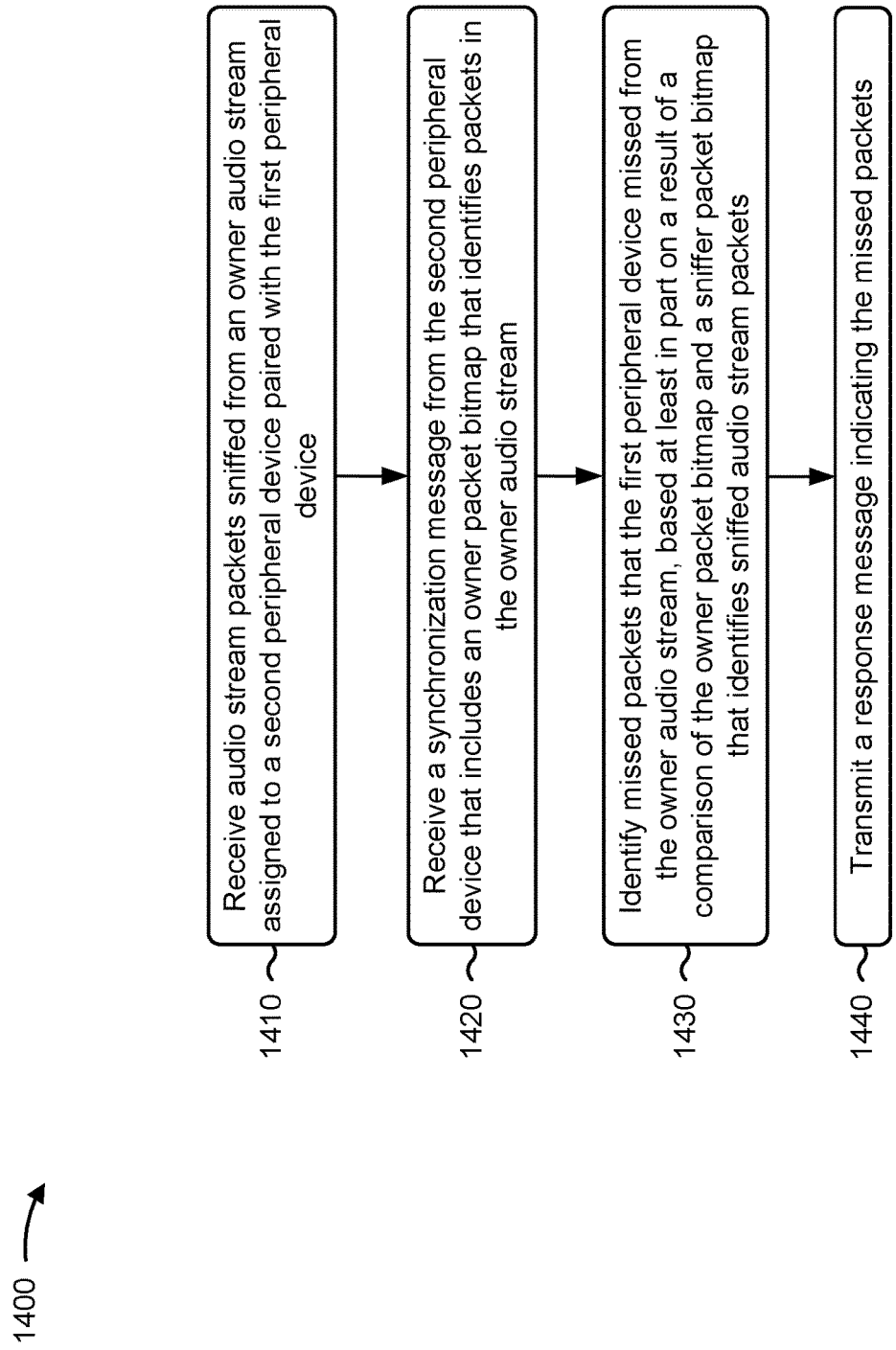

TECHNIQUES FOR STEREO ON PERIPHERAL DEVICES

FIELD OF THE DISCLOSURE

Aspects of the present disclosure generally relate to wireless communication and to techniques and apparatuses associated with stereo on peripheral devices.

BACKGROUND

A wireless personal area network (WPAN) is a short-range wireless network typically established by a user to interconnect various personal devices, sensors, and/or appliances located within a certain distance or area of the user. For example, a WPAN based on a communication protocol such as a Bluetooth® (BT) protocol, a Bluetooth Low Energy (BLE) protocol, or a Zigbee® protocol may provide wireless connectivity to peripheral devices that are within a specific distance (e.g., 5 meters, 10 meters, 20 meters, 100 meters) of each other. Bluetooth is a short-range wireless communication protocol that supports a WPAN between a central device (such as a host device or a source device) and at least one peripheral device (such as a client device or a sink device). However, power consumption associated with Bluetooth communications that operate on a basic rate (BR) and/or enhanced data rate (EDR) physical layer may render WPAN communication impractical in certain applications.

Accordingly, to address the power consumption challenges associated with Bluetooth BR/EDR (sometimes referred to as a Bluetooth classic or Bluetooth legacy protocol), BLE (also referred to herein as WPAN LE) was developed and adopted in various applications in which data transfers are relatively infrequent and/or to enable WPAN communication with low power consumption. For example, BLE exploits infrequent data transfer by using a low duty cycle operation and placing one or both of the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE-enabled smartphones, tablets, laptops, earbuds, or the like. While traditional (or classic) Bluetooth and BLE offer certain advantages, there exists a need for further improvements in Bluetooth and BLE technology. For example, traditional Bluetooth and BLE have a limited range, have a limited data capacity throughput, and are susceptible to interference from other devices communicating in the same frequency band (such as via wireless local area network (WLAN) communications).

SUMMARY

Some aspects described herein relate to a method of wireless communication performed by a first peripheral device. The method may include receiving audio stream packets sniffed from an owner audio stream assigned to a second peripheral device paired with the first peripheral device. The method may include receiving a synchronization message from the second peripheral device that includes an owner packet bitmap that identifies packets in the owner audio stream. The method may include identifying missed packets that the first peripheral device missed from the owner audio stream, based at least in part on a result of a comparison of the owner packet bitmap and a sniffer packet bitmap that identifies sniffed audio stream packets. The method may include transmitting a response message indicating the missed packets.

Some aspects described herein relate to a method of wireless communication performed by a second peripheral device. The method may include receiving audio stream packets from an owner audio stream assigned to the second peripheral device. The method may include transmitting, to a first peripheral device paired with the second peripheral device, a synchronization message that includes an owner packet bitmap that identifies packets in the owner audio stream. The method may include receiving a response message that identifies missed packets that the first peripheral device missed from the owner audio stream.

Some aspects described herein relate to an apparatus for wireless communication at a first peripheral device. The apparatus may include one or more memories and one or more processors coupled to the one or more memories. The one or more processors may be configured to receive audio stream packets sniffed from an owner audio stream assigned to a second peripheral device paired with the first peripheral device. The one or more processors may be configured to receive a synchronization message from the second peripheral device that includes an owner packet bitmap that identifies packets in the owner audio stream. The one or more processors may be configured to identify missed packets that the first peripheral device missed from the owner audio stream, based at least in part on a result of a comparison of the owner packet bitmap and a sniffer packet bitmap that identifies sniffed audio stream packets. The one or more processors may be configured to transmit a response message indicating the missed packets.

Some aspects described herein relate to an apparatus for wireless communication at a second peripheral device. The apparatus may include one or more memories and one or more processors coupled to the one or more memories. The one or more processors may be configured to receive audio stream packets from an owner audio stream assigned to the second peripheral device. The one or more processors may be configured to transmit, to a first peripheral device paired with the second peripheral device, a synchronization message that includes an owner packet bitmap that identifies packets in the owner audio stream. The one or more processors may be configured to receive a response message that identifies missed packets that the first peripheral device missed from the owner audio stream.

Some aspects described herein relate to a non-transitory computer-readable medium that stores a set of instructions for wireless communication by a first peripheral device. The set of instructions, when executed by one or more processors of the first peripheral device, may cause the first peripheral device to receive audio stream packets sniffed from an owner audio stream assigned to a second peripheral device paired with the first peripheral device. The set of instructions, when executed by one or more processors of the first peripheral device, may cause the first peripheral device to receive a synchronization message from the second peripheral device that includes an owner packet bitmap that identifies packets in the owner audio stream. The set of instructions, when executed by one or more processors of the first peripheral device, may cause the first peripheral device to identify missed packets that the first peripheral device missed from the owner audio stream, based at least in part on a result of a comparison of the owner packet bitmap and a sniffer packet bitmap that identifies sniffed audio stream packets. The set of instructions, when executed by one or more processors of the first peripheral device, may cause the first peripheral device to transmit a response message indicating the missed packets.

Some aspects described herein relate to a non-transitory computer-readable medium that stores a set of instructions for wireless communication by a second peripheral device. The set of instructions, when executed by one or more processors of the second peripheral device, may cause the second peripheral device to receive audio stream packets from an owner audio stream assigned to the second peripheral device. The set of instructions, when executed by one or more processors of the second peripheral device, may cause the second peripheral device to transmit, to a first peripheral device paired with the second peripheral device, a synchronization message that includes an owner packet bitmap that identifies packets in the owner audio stream. The set of instructions, when executed by one or more processors of the second peripheral device, may cause the second peripheral device to receive a response message that identifies missed packets that the first peripheral device missed from the owner audio stream.

Some aspects described herein relate to an apparatus for wireless communication. The apparatus may include means for receiving audio stream packets sniffed from an owner audio stream assigned to a second peripheral device paired with the first peripheral device. The apparatus may include means for receiving a synchronization message from the second peripheral device that includes an owner packet bitmap that identifies packets in the owner audio stream. The apparatus may include means for identifying missed packets that the first peripheral device missed from the owner audio stream, based at least in part on a result of a comparison of the owner packet bitmap and a sniffer packet bitmap that identifies sniffed audio stream packets. The apparatus may include means for transmitting a response message indicating the missed packets.

Some aspects described herein relate to an apparatus for wireless communication. The apparatus may include means for receiving audio stream packets from an owner audio stream assigned to the second peripheral device. The apparatus may include means for transmitting, to a first peripheral device paired with the second peripheral device, a synchronization message that includes an owner packet bitmap that identifies packets in the owner audio stream. The apparatus may include means for receiving a response message that identifies missed packets that the first peripheral device missed from the owner audio stream.

Aspects generally include a method, apparatus, system, computer program product, non-transitory computer-readable medium, user equipment, base station, network entity, network node, central device, peripheral device, wireless communication device, access point, mobile station, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 13 is a diagram illustrating an example of using a nonce for packet counters, in accordance with the present disclosure.

FIG. 14 is a diagram illustrating an example process performed, for example, at a first peripheral device or an apparatus of a first peripheral device, in accordance with the present disclosure.

DETAILED DESCRIPTION

Figure 1:
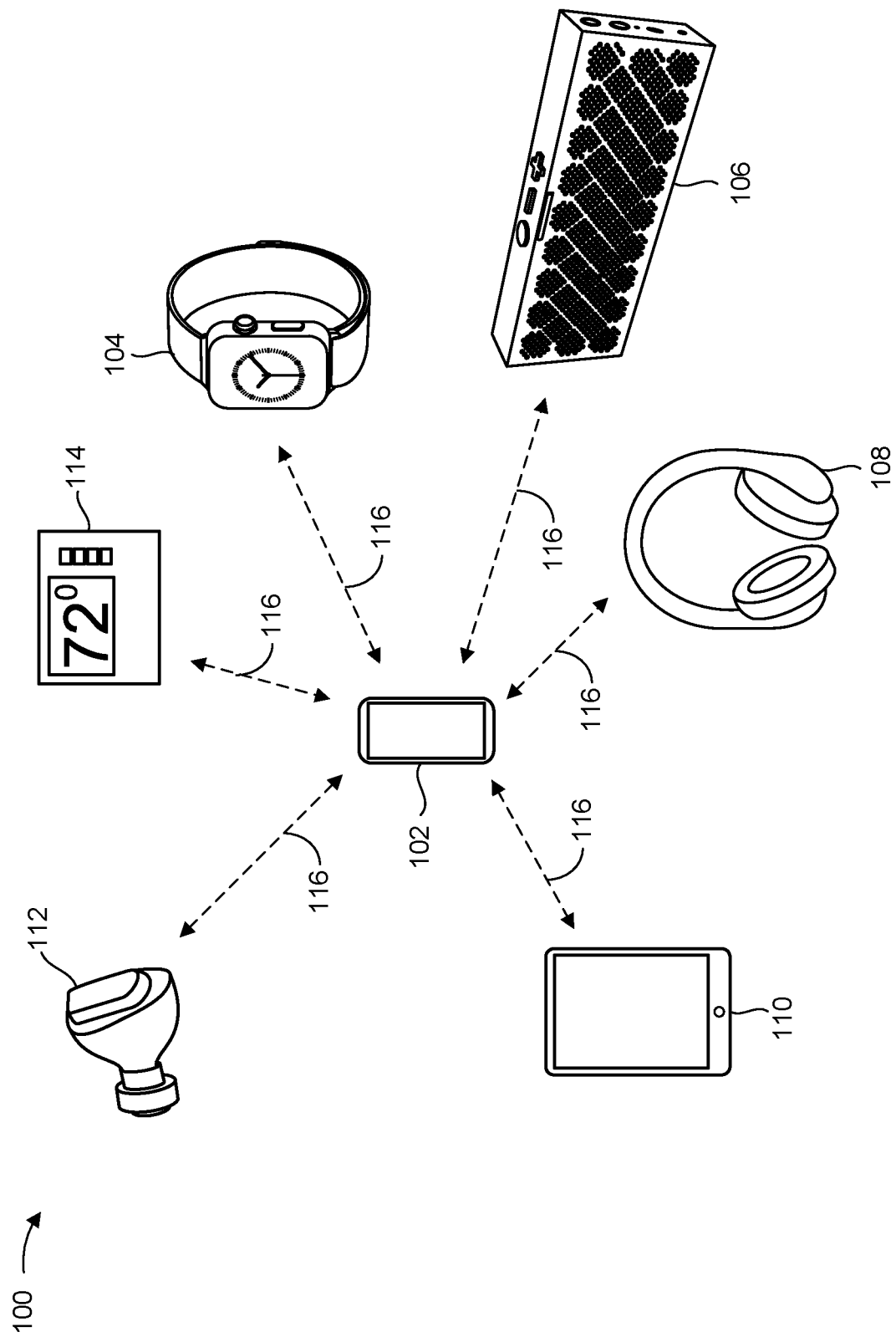
FIG. 1 is a diagram illustrating an example of a wireless personal area network (WPAN), in accordance with the present disclosure.

In a wireless personal area network (WPAN), such as a Bluetooth (BT) network or a Bluetooth Low Energy (BLE) network, wireless audio may stream from a central device (e.g., a handset, a smartphone) to multiple peripheral devices (e.g., a left earbud and a right earbud). A primary or owner earbud may receive packets from a central device, such as a user equipment (UE), in a stream directed to the owner earbud. An owner stream (e.g., left (L) stream) is meant for the owner earbud and the owner earbud provides acknowledgements (ACKs) for packets on the owner stream. A secondary or sniffer earbud, paired with the owner earbud, may sniff packets on the stream to receive packets. The sniffer earbud sniffs (receives packets without providing ACKs to the UE) from the owner stream (e.g., L stream). The sniffer earbud may be an owner of its own stream (e.g., right (R) stream), and the other earbud may sniff the R stream. The owner stream may be a joint L+R stream. The earbuds may relay packets to each other for their respective owned streams depending on the configuration. In this way, stereo or spatial audio may be provided by the earbuds. However, in some configurations, packets missed by one earbud may not be successfully relayed from the other earbud. This causes a drop in audio performance of stereo or spatial audio. Furthermore, the packets may be decrypted, and decryption may depend on a key associated with a packet counter. If the packet counter of the packet recipient is not aligned with the packet counter of the packet source (e.g., UE), decryption will fail and audio quality may be affected. While the owner earbud is generally able to keep its packet counter aligned with the packet counter of the packet source, it is the sniffer earbud that has the challenge of keeping its packet counter aligned with the packet counter of the packet source.

According to various aspects described herein, the earbuds may perform a synchronization handshake (sync-up handshake). The owner earbud may transmit a synchronization message (e.g., periodically or by a trigger) and the sniffer earbud may respond. The owner earbud may have generated a bitmap of received packets and may share the bitmap with the sniffer earbud (e.g., in the synchronization message). The sniffer earbud may identify missed packets, transmit a response identifying the missed packets, and receive the missed packets. In this way, packets are not missing in the audio output and the audio performance (stereo and/or spatial audio) is available and/or is not degraded.

In some aspects, the sniffer earbud may generate and share its own bitmap. The earbuds may jointly share missed packets. In some aspects, the sniffer earbud may use a nonce for a current packet and a next packet and a rule to select a key for decrypting packets from among at least two keys associated with two counter values, to account for any misalignment of a packet counter of the sniffer earbud and the packet counter of the owner earbud. In this way, audio performance is not degraded for encrypted packets.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a WPAN 100, according to some implementations. Within the WPAN 100, a central device 102 (which may be referred to herein as a source device or using other suitable terminology) may connect to and may establish a communication link 116 with one or more peripheral devices, such as a smartwatch 104, a Bluetooth portable speaker 106, wireless headphones 108, a tablet 110, a wireless earbud 112, and/or a smart appliance 114 (which may be referred to herein as sink devices or using other suitable terminology) using a BLE protocol or a modified BLE protocol. The BLE protocol is part of the BT core specification and enables radio frequency communication operating within the globally accepted 2.4 GHz Industrial, Scientific, and Medical (ISM) band.

In some aspects, as described herein, the central device 102 may include suitable logic, circuitry, interfaces, processors, and/or code that may be used to communicate with the one or more peripheral devices 104, 106, 108, 110, 112, and/or 114 using the BLE protocol or the modified BLE protocol. In some aspects, the central device 102 may operate as an initiator to request establishment of a link layer (LL) connection with an intended peripheral device 104, 106, 108, 110, 112, and/or 114. In some aspects, a link manager may be used to control operations between a WPAN application controller in the central device 102 and a WPAN application controller in each of the intended peripheral devices 104, 106, 108, 110, 112, and/or 114.

In some aspects, after a requested LL connection is established, the central device 102 may become a host device, and the selected or intended peripheral device 104, 106, 108, 110, 112, and/or 114 may become paired with the central device 102 over the established LL connection. As a host device, the central device 102 may support multiple concurrent LL connections with various peripheral devices 104, 106, 108, 110, 112, and/or 114 that are operating as client devices. For example, the central device 102 may manage various aspects of data packet communication in an LL connection with one or more associated peripheral devices 104, 106, 108, 110, 112, and/or 114. For example, the central device 102 may determine an operation schedule in the LL connection with one or more peripheral devices 104, 106, 108, 110, 112, and/or 114. The central device 102 may also initiate an LL protocol data unit (PDU) exchange sequence over the LL connection. LL connections may be configured to run periodic connection events in dedicated data channels. The exchange of LL data PDU transmissions between the central device 102 and one or more of the peripheral devices 104, 106, 108, 110, 112, and/or 114 may take place within connection events.

In some aspects, the central device 102 may be configured to transmit the first LL data PDU in each connection event to an intended peripheral device 104, 106, 108, 110, 112, and/or 114. Additionally, or alternatively, in some aspects, the central device 102 may utilize a polling scheme to poll the intended peripheral device 104, 106, 108, 110, 112, and/or 114 for an LL data PDU transmission during a connection event. The intended peripheral device 104, 106, 108, 110, 112, and/or 114 may transmit an LL data PDU upon receipt of a packet carrying an LL data PDU from the central device 102. In some other aspects, a peripheral device 104, 106, 108, 110, 112, and/or 114 may transmit an LL data PDU to the central device 102 without first receiving an LL data PDU from the central device 102.

Examples of the central device 102 may include a cellular phone, a smartphone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch or wireless headphones), a vehicle, a vehicle infotainment system or car kit, an electric meter, a gas pump, a toaster, a thermostat, a hearing aid, a blood glucose on-body unit, an Internet-of-Things (IoT) device, or the like.

Examples of the one or more peripheral devices 104, 106, 108, 110, 112, and/or 114 may include a cellular phone, a smartphone, an SIP phone, an STA, a laptop, a PC, a desktop computer, a PDA, a satellite radio, a global positioning system, a multimedia device, a video device, a digital audio player, a camera, a game console, a tablet, a smart device, a wearable device (e.g., a smart watch, wireless headphones, or wireless earbuds), a vehicle, a vehicle infotainment system or car kit, an electric meter, a gas pump, a toaster, a thermostat, a hearing aid, a blood glucose on-body unit, an IoT device, or the like. Although the central device 102 is illustrated in FIG. 1 as being in communication with six peripheral devices 104, 106, 108, 110, 112, and 114 in the WPAN 100, the central device 102 may communicate with more or fewer than six peripheral devices within the WPAN 100 without departing from the scope of the present disclosure.

In some aspects, a device implementing the BT protocol (e.g., the central device 102) may operate according to a first radio mode (e.g., a basic rate (BR)/enhanced data rate (EDR) radio mode), and a device implementing the BLE protocol may operate according to a second radio mode (e.g., the BLE radio mode). In some aspects, the central device 102 may be configured with dual radio modes, and therefore may be able to operate according to the BR/EDR mode or the BLE mode, for example, based on the type of short-range wireless communication in which the central device 102 may engage.

For example, in some aspects, the central device 102 may operate according to the BR/EDR mode for continuous streaming of data, for broadcast networks, for mesh networks, and/or for some other applications in which a relatively higher data rate may be more suitable. Additionally, or alternatively, the central device 102 may operate according to the BLE mode for short burst data transmissions, such as for some other applications in which power conservation may be desirable and/or a relatively lower data rate may be acceptable. Additionally, or alternatively, in some aspects, the central device 102 may operate according to one or more other radio modes, such as proprietary radio mode(s). Examples of other radio modes may include high speed radio modes, low energy radio modes, and/or isochronous radio modes, among other examples.

In some aspects, as described in more detail elsewhere herein, an assisting wireless device (e.g., among peripheral devices 104, 106, 108, 110, 112, and 114) may track a first retransmission metric that is based on a number of retransmitted packets that the assisting wireless device received from a source device, such as the central device 102. The assisting wireless device may receive, from a sink wireless device (e.g., among peripheral devices 104, 106, 108, 110, 112, and 114), an acknowledgement assistance request indicating a second retransmission metric for the sink wireless device. The assisting wireless device may transmit, to the sink wireless device, a response to the acknowledgement assistance request based on respective values of the first retransmission metric and the second retransmission metric. Additionally, or alternatively, the assisting wireless device may perform one or more other operations described herein.

In some aspects, as described in more detail elsewhere herein, a sink wireless device (e.g., among peripheral devices 104, 106, 108, 110, 112, and 114) may track a first retransmission metric that is based on a number of retransmitted packets that the sink wireless device received from a source device, such as the central device 102. The sink wireless device may transmit, to an assisting wireless device (e.g., among peripheral devices 104, 106, 108, 110, 112, and 114), an acknowledgement assistance request indicating the first retransmission metric tracked by the sink wireless device. The sink wireless device may receive, from the assisting wireless device, a response to the acknowledgement assistance request based on respective values of the first retransmission metric tracked by the sink wireless device and a second retransmission metric tracked by the assisting wireless device. Additionally, or alternatively, the sink wireless device may perform one or more other operations described herein.

As indicated above, FIG. 1 is provided as an example. Other examples may differ from what is described with regard to FIG. 1.

Figure 2:
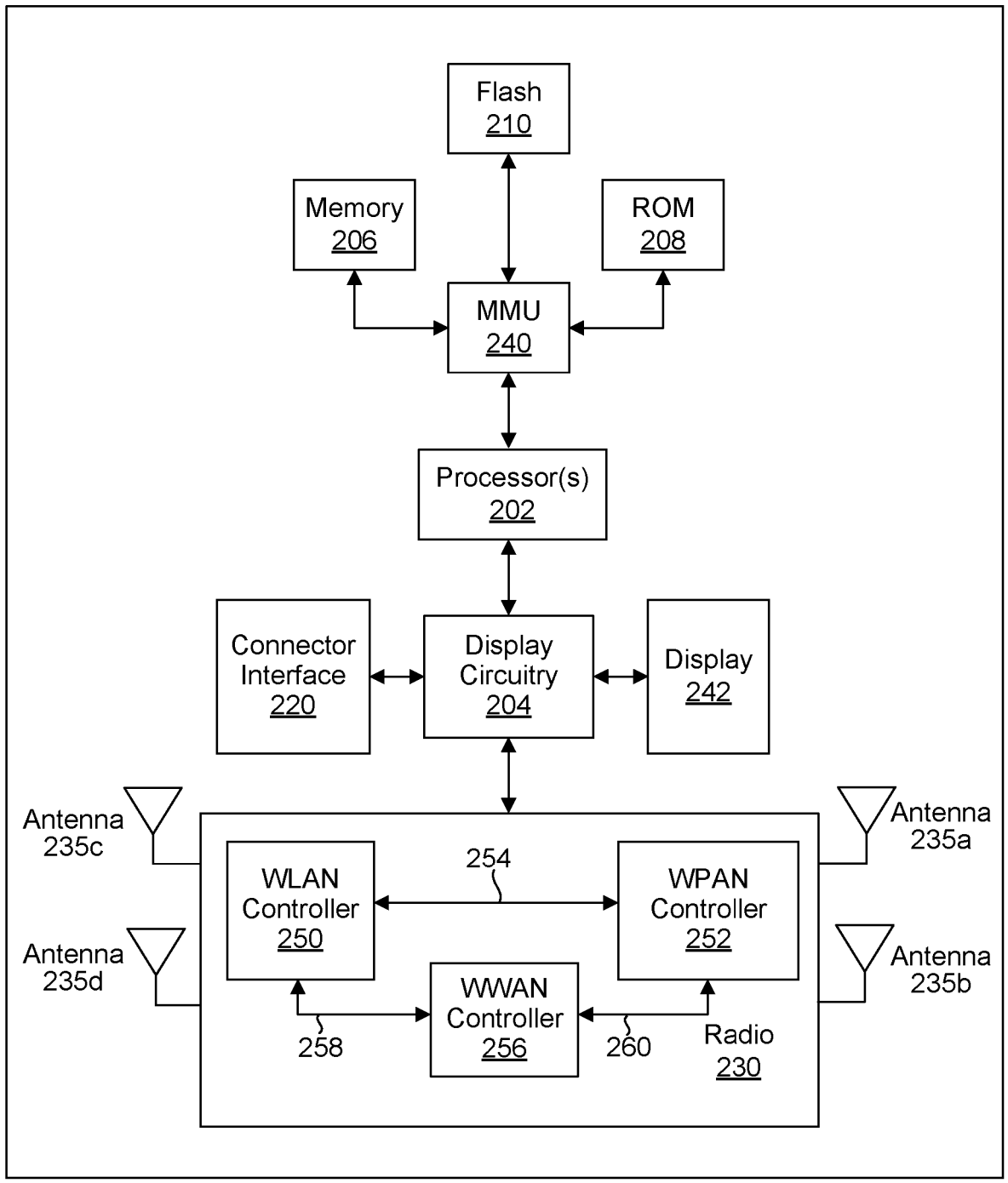
FIG. 2 is a diagram illustrating an example of a wireless communication device, in accordance with the present disclosure.

FIG. 2 is a diagram illustrating an example of a wireless communication device 200, in accordance with the present disclosure. In some aspects, the wireless communication device 200 may be an example of the central device 102 illustrated in FIG. 1. Additionally, or alternatively, the wireless communication device 200 may be an example of one or more of the peripheral devices 104, 106, 108, 110, 112, or 114 illustrated in FIG. 1. In some aspects, the wireless communication device 200 may be a Bluetooth-enabled device (such as a BLE device).

As shown in FIG. 2, the wireless communication device 200 may include a processing element, such as processor(s) 202, which may execute program instructions for the wireless communication device 200. The wireless communication device 200 may also include a display 242 that can perform graphics processing and present information to a user. The processor(s) 202 may also be coupled to a memory management unit (MMU) 240, which may be configured to receive addresses from the processor(s) 202 and translate the addresses to address locations in memory such as memory 206, ROM 208, or flash memory 210 and/or to address locations in other circuits or devices, such as display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless communication device 200. For example, the wireless communication device 200 may include various memory types, a connector interface 220 through which the wireless communication device 200 can communicate with a computer system, and wireless communication subsystems that can transmit data to, and receive data from, other devices based on one or more wireless communication standards or protocols. For example, in some aspects, the wireless communication subsystems may include (but are not limited to) a wireless local-area network (WLAN) subsystem, a WPAN subsystem, and/or a cellular subsystem (such as a Long-Term Evolution (LTE) or New Radio (NR) subsystem). The wireless communication device 200 may include multiple antennas 235a, 235b, 235c, and/or 235d for performing wireless communication with, for example, wireless communication devices in a WPAN. In some aspects, the WPAN may be an extended PAN (XPAN).

The wireless communication device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an FPGA, and/or an application specific integrated circuit (ASIC).

In some aspects, the radio 230 may include separate controllers configured to control communications for various respective radio access technology (RAT) protocols. For example, as shown in FIG. 2, radio 230 may include a WLAN controller 250 that manages WLAN communications, a WPAN controller 252 that manages Bluetooth, BLE, and/or other suitable WPAN communications, and a wireless wide area network (WWAN) controller 256 that manages WWAN communications. In some aspects, the wireless communication device 200 may store and execute a WLAN software driver for controlling WLAN operations performed by the WLAN controller 250, a WPAN software driver for controlling WPAN operations performed by the WPAN controller 252, and/or a WWAN software driver for controlling WWAN operations performed by the WWAN controller 256.

In some aspects, a first coexistence interface 254 (such as a wired interface) may be used for sending information between the WLAN controller 250 and the WPAN controller 252. Additionally, or alternatively, in some aspects, a second coexistence interface 258 may be used for sending information between the WLAN controller 250 and the WWAN controller 256. Additionally, or alternatively, in some aspects, a third coexistence interface 260 may be used for sending information between the WPAN controller 252 and the WWAN controller 256.

In some aspects, one or more of the WLAN controller 250, the WPAN controller 252, and/or the WWAN controller 256 may be implemented as hardware, software, firmware, or any suitable combination thereof.

In some aspects, the WLAN controller 250 may be configured to communicate with a second device in a WPAN using a WLAN link using one or more, some, or all of the antennas 235a, 235b, 235c, and 235d. In other configurations, the WPAN controller 252 may be configured to communicate with at least one second device in a WPAN using one or more, some, or all of the antennas 235a, 235b, 235c, and 235d. In other configurations, the WWAN controller 256 may be configured to communicate with a second device in a WPAN using one or more, some, or all of the antennas 235a, 235b, 235c, and 235d. The WLAN controller 250, the WPAN controller 252, and/or the WWAN controller 256 may be configured to adjust a wakeup time interval and a shutdown time for the wireless communication device 200.

A short-range wireless communications protocol, such as BT, BLE, and/or BR/EDR, may include and/or may use one or more other communications protocols, for example, to establish and maintain communications links. Referring also to FIG. 1, the wireless communication device 200 may establish a communications link 116 with one or more peripheral devices, such as a wireless headset 112, according to at least one communications protocol for short-range wireless communications. In some aspects, the communications link 116 may include a communications link that adheres to a protocol included and/or for use with BT, BLE, BR/EDR, or the like. In one aspect, the communications link 116 may include an asynchronous connection-oriented logical (ACL) transport, sometimes referred to as an ACL link. When operating as an ACL link, the communications link 116 may allow the central device 102 (e.g., a source device) to connect or "pair" with a peripheral device, such as the headset 112. The connection is asynchronous in that the two devices may not need to synchronize, timewise, data communications between each other to permit communication of data packets via the communications link 116.

In some aspects, a logical link control and adaptation protocol (L2CAP) may be used within a BT protocol stack (not shown in FIG. 2 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some aspects, the communications link 116 may include an advanced audio distribution profile (A2DP) link. For example, an A2DP link may provide a point-to-point link between a source device, such as the central device 102, and a sink device, such as the headset 112. With an A2DP link, data packets including audio may be transmitted over an ACL channel, and other information (e.g., for controlling the audio stream) may be transmitted over a separate control channel. The data packets may occur non-periodically.

In some aspects, the communications link 116 may support synchronous logical transport mechanisms between a source device (such as the central device 102) and a peripheral device (such as the headset 112). For example, the communications link 116 may include a synchronous connection-oriented (SCO) link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience.

In some aspects, the communications link 116 may include an extended SCO (eSCO) link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link 116 shown in FIG. 1 may include an isochronous (ISO) link. When operating as an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, a first peripheral device (e.g., wireless communication device 200, earbud, wearable device, portable speaker) includes means for receiving audio stream packets sniffed from an owner audio stream assigned to a second peripheral device paired with the first peripheral device; means for receiving a synchronization message from the second peripheral device that includes an owner packet bitmap that identifies packets in the owner audio stream; means for identifying missed packets that the first peripheral device missed from the owner audio stream, based at least in part on a result of a comparison of the owner packet bitmap and a sniffer packet bitmap that identifies sniffed audio stream packets; and/or means for transmitting a response message indicating the missed packets. The means for the first peripheral device to perform operations described herein may include, for example, one or more of antennas 235a-235d, WPAN controller 252, radio 230, and/or processor 202, among other examples.

In some aspects, a second peripheral device (e.g., wireless communication device 200, earbud, wearable device, portable speaker) includes means for receiving audio stream packets from an owner audio stream assigned to the second peripheral device; means for transmitting, to a first peripheral device paired with the second peripheral device, a synchronization message that includes an owner packet bitmap that identifies packets in the owner audio stream; and/or means for receiving a response message that identifies missed packets that the first peripheral device missed from the owner audio stream. The means for the second peripheral device to perform operations described herein may include, for example, one or more of antennas 235a-235d, WPAN controller 252, radio 230, and/or processor 202, among other examples.

As indicated above, FIG. 2 is provided as an example. Other examples may differ from what is described with regard to FIG. 2.

Figure 3:
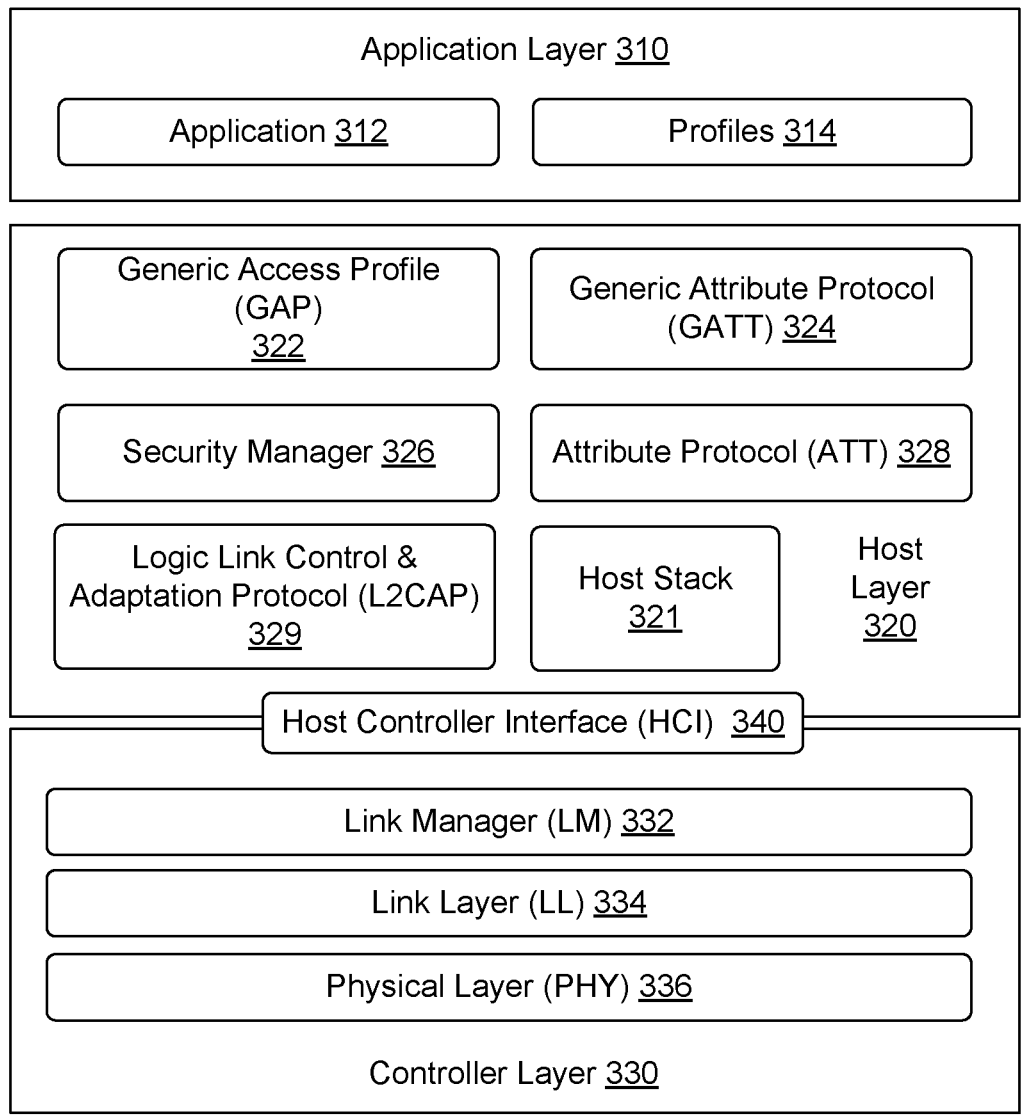
FIG. 3 is a diagram illustrating an example of a protocol stack, in accordance with the present disclosure.

FIG. 3 is a diagram illustrating an example 300 of a protocol stack (e.g., a WPAN and/or a Bluetooth protocol stack), in accordance with the present disclosure. In some aspects, the protocol stack 300 may be implemented in a wireless communication device (such as the central device 102 or one or more of the peripheral devices 104, 106, 108, 110, 112, or 114 of FIG. 1). For example, the protocol stack 300 may be implemented by one or more of processor(s) 202, memory 206, flash memory 210, ROM 208, the radio 230, and/or the WPAN controller 252 illustrated in FIG. 2. In some aspects, the protocol stack 300 may be organized into three layers that include an application layer 310, a host layer 320, and a controller layer 330.

In some aspects, the application layer 310 may be a user application layer that interfaces with the other blocks and/or layers of the protocol stack 300. In some aspects, the application layer 310 may include one or more applications 312 and one or more Bluetooth profiles 314 that allow the one or more applications 312 to use Bluetooth and/or BLE communications. The host layer 320 may include the upper layers of the protocol stack 300, and may communicate with a controller (such as the WPAN controller 252 of FIG. 2) in a wireless communication device using a host controller interface (HCI) 340. In some aspects, the host layer 320 may include a host stack 321 that can be used for application layer interface management to allow an application 312 to access WPAN communications.

The controller layer 330 may include the lower layers of the protocol stack 300. In some aspects, the controller layer 330 may be used for hardware interface management, link establishment, and link management. As shown in FIG. 3, the controller layer 330 may include a link manager (LM) 332, a link layer 334, and a physical (PHY) layer 336. The PHY layer 336 may include, for example, a radio and/or a baseband processor. In some aspects, the PHY layer 336 may define a mechanism for transmitting a bit stream over a physical link or channel that connects WPAN devices. The bit stream may be grouped into code words or symbols, and may be converted to a data packet that is transmitted over a wireless transmission medium. The PHY layer 336 may provide an electrical, mechanical, and/or procedural interface to the wireless transmission medium. The PHY layer 336 may be responsible for modulation and demodulation of data into radio frequency (RF) signals for transmission over the air. The PHY layer 336 may describe the physical characteristics of a transmitter/receiver (or transceiver) included in a wireless communication device. The physical characteristics may include modulation characteristics, an RF tolerance, and/or a sensitivity level, among other examples.

In some aspects, the link layer 334 is responsible for low-level communication over the PHY layer 336. The link layer 334 may manage the sequence and timing for transmitting and receiving data packets, and using an LL protocol, communicates with other devices regarding connection parameters and data flow control. The link layer 334 also provides gatekeeping functionality to limit exposure and data exchange with other devices. If filtering is configured, the link layer 334 maintains a list of allowed devices and may ignore all requests for data exchange from devices not on the list of allowed devices. The link layer 334 may also reduce power consumption. In some aspects, the link layer 334 may include a proprietary LL that may be used to discover peer devices and establish a secure communication channel with the peer devices. In some aspects, the link layer 334 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The link manager 332 may be responsible for establishing and configuring links and managing power-change requests, among other tasks. Each type of logical link, such as ACL links, A2DP links, SCO links, eSCO links, ISO links, or the like, may be associated with a specific packet type. For example, an SCO link may provide reserved channel bandwidth for communication between a central device and a peripheral device, and may support regular, periodic exchange of data packets with no retransmissions. An eSCO link may provide reserved channel bandwidth for communication between a source device and a peripheral device, and support regular, periodic exchange of data packets with retransmissions. An ACL link may exist between a source device and a peripheral device from the beginning of establishment of a connection between the source device and the peripheral device, and the data packets for ACL links may include encoding information in addition to a payload.

The link manager 332 may communicate with the host layer 320 using the HCI 340. In some aspects, the link manager 332 may translate commands associated with the HCI 340 into controller-level operations, such as baseband-level operations. The HCI 340 may act as a boundary between the lower layers (such as between the controller layer 330, the host layer 320, and the application layer 310). The BT specification may define a standard HCI to support BT systems that are implemented across two separate processors. For example, a BT system on a computer may use a processor of the BT system to implement the lower layers of the protocol stack 300, such as the PHY layer 336, the link layer 334, and/or the link manager 332, and may use a processor of a BT component to implement the other layers of the protocol stack 300, such as the host layer 320 and the application layer 310.

In FIG. 3, the host layer 320 is shown to include a generic access profile (GAP) 322, a generic attribute protocol (GATT) 324, a security manager (SM) 326, an attribute protocol (ATT) 328, and an L2CAP layer 329. The GAP 322 may provide an interface for an application 312 to initiate, establish, and manage connections with other WPAN (e.g., BT or BLE) devices. The GATT 324 may provide a service framework using the attribute protocol for discovering services, and for reading and writing characteristic values on a peer device. The GATT 324 may interface with the application 312, for example, through a profile which may define a collection of attributes and any permissions needed for the attributes to be used in BT or BLE communications.

The security manager 326 may be responsible for device pairing and key distribution. A security manager protocol implemented by the security manager 326 may define how communications with the security manager of a counterpart BLE device are performed. The security manager 326 provides additional cryptographic functions that may be used by other components of the protocol stack 300. The architecture of the security manager 326 used in WPAN communications is designed to minimize recourse requirements for peripheral devices by shifting work to a presumably more powerful central device. BLE uses a pairing mechanism for key distribution. The security manager 326 provides a mechanism to encrypt the data and a mechanism to provide data authentication.

The ATT 328 includes a client/server protocol based on attributes associated with a BLE device configured for a particular purpose. Examples may include monitoring heart rate, temperature, broadcasting advertisements, or the like. The attributes may be discovered, read, and written by peer devices. The set of operations which are executed over the ATT 328 may include error handling, server configuration, find information, read operations, write operations, and/or queued writes. The ATT 328 may form the basis of data exchange between BT and BLE devices.

The L2CAP layer 329 may be implemented above the HCI 340, and may communicate with the controller layer 330 through the HCI 340. The L2CAP layer 329 may be responsible for establishing connections across one or more existing logical links and for requesting additional links if none exist. The L2CAP layer 329 may also implement multiplexing between different higher-layer protocols, for example, to allow different applications to use a single link, such as a logical link, including an ACL link. In some implementations, the L2CAP layer 329 may encapsulate multiple protocols from the upper layers into a data packet format (and vice versa). The L2CAP layer 329 may also break packets with a large data payload from the upper layers into multiple packets with the data payload segmented into smaller size data payloads that fit into a maximum payload size (for example, twenty-seven (27) bytes) on the transmit side.

In some standards and protocols, such as BLE and/or BR/EDR, the central device 102 may detect errors in a packet and/or a dropped/missed/not received packet through the use of cyclic redundancy check (CRC) validation and through the use of message integrity code (MIC) validation. MIC validation may be used when a packet is encrypted. For example, failure of CRC validation may indicate one or more errors in a received packet, and failure of MIC validation may indicate that another packet has not been received (although failure of CRC validation may also indicate that another packet has not been received, and/or failure of MIC validation may also indicate one or more errors in a received packet).

CRC validation and MIC validation may be based on generating CRC values and MICs, respectively, based on received packets and respectively comparing those generated CRC values and MICs to CRC values and MICs included in the received packets. Specifically, a receiving device, such as the headset 112, that receives a packet may first generate a CRC value or a CRC checksum based on the received packet, such as based on a payload and, if applicable, an MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines that the received packet fails CRC validation, then the received packet may include errors and/or may be corrupted. In one configuration, the receiving device may discard the received packet that fails CRC validation. Alternatively, in another configuration, the receiving device may attempt to recover the received packet, for example, using one or more error correction techniques.

If the received packet is encrypted and passes CRC validation, then the receiving device may decrypt the received packet to obtain a decrypted payload and a decrypted MIC. For MIC validation, the receiving device may generate an MIC based on the decrypted payload and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation. Alternatively, in another configuration, the receiving device may attempt to recover the received packet.

As indicated above, FIG. 3 is provided as an example. Other examples may differ from what is described with regard to FIG. 3.

Figure 4:
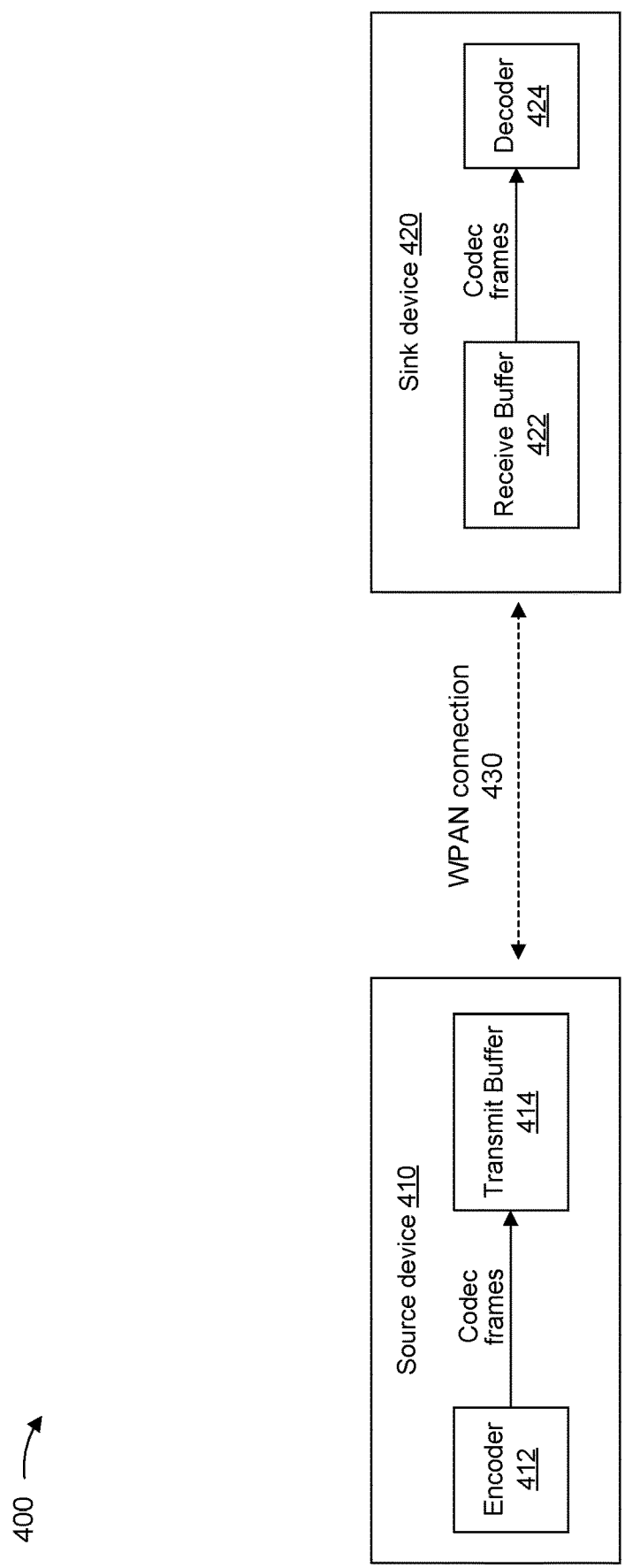
FIG. 4 is a diagram illustrating an example transmission of a data packet from a wireless communication device to a peripheral device over a WPAN connection, in accordance with the present disclosure.

FIG. 4 is a diagram illustrating an example transmission 400 of a data packet from a source device 410 to a sink device 420 over a WPAN connection 430, according to the present disclosure. In some aspects, the source device 410 may be one example of the central device 102 in FIG. 1 and/or the wireless communication device 200 in FIG. 2, and the sink device 420 may be an example of one or more of the peripheral devices 104, 106, 108, 110, 112 or 114 in FIG. 1. In some aspects, the sink device 420 may be a wireless earbud, a pair of wireless earbuds, a wireless portable speaker, or another suitable device. The WPAN connection 430 may be any suitable Bluetooth or BLE connection or link. In some instances, the WPAN connection 430 may be one or more of an ACL link, an L2CAP link, an A2DP link, an SCO link, or an ISO link.

As shown in FIG. 4, the source device 410 may include an encoder 412 and a transmit buffer 414. The encoder 412 may be configured to encode data, such as audio or video data, using a specified bitrate. The transmit buffer 414 may be configured to queue data packets that are to be transmitted over the WPAN connection 430 to the sink device 420. In some implementations, the data packets to be transmitted over the WPAN connection 430 may have a predefined size, for example, based on the type of WPAN connection 430 and/or channel conditions associated with the WPAN connection 430. In some aspects, data encoded by the encoder 412 may be packetized into a data packet of a predefined size. The source device 410 may de-queue data packets from the transmit buffer 414 and transmit the data packets to the sink device 420 over the WPAN connection 430.

As further shown in FIG. 4, the sink device 420 may include a receive buffer 422 and a decoder 424. Data packets that the sink device 420 receives over the WPAN connection 430 may be queued or otherwise stored in the receive buffer 422. The data packets may be output from the receive buffer 422 and forwarded to the decoder 424. In some aspects, the decoder 424 may decode data (such as audio and/or video data) carried in the payloads of the queued data packets, and forward the decoded data to upper layers of the protocol stack for processing and playback to a user. In some implementations, the encoder 412 may encode a first encoder/decoder (codec) frame using a first bitrate and forward the first codec frame to the transmit buffer 414 to be packetized for transmission to the sink device 420 over the WPAN connection 430. The sink device 420 may queue the received data packet in the receive buffer 422 and may forward the first portion of the first codec frame to the decoder 424 for decoding.

As indicated above, FIG. 4 is provided as an example. Other examples may differ from what is described with regard to FIG. 4.

Figure 5:
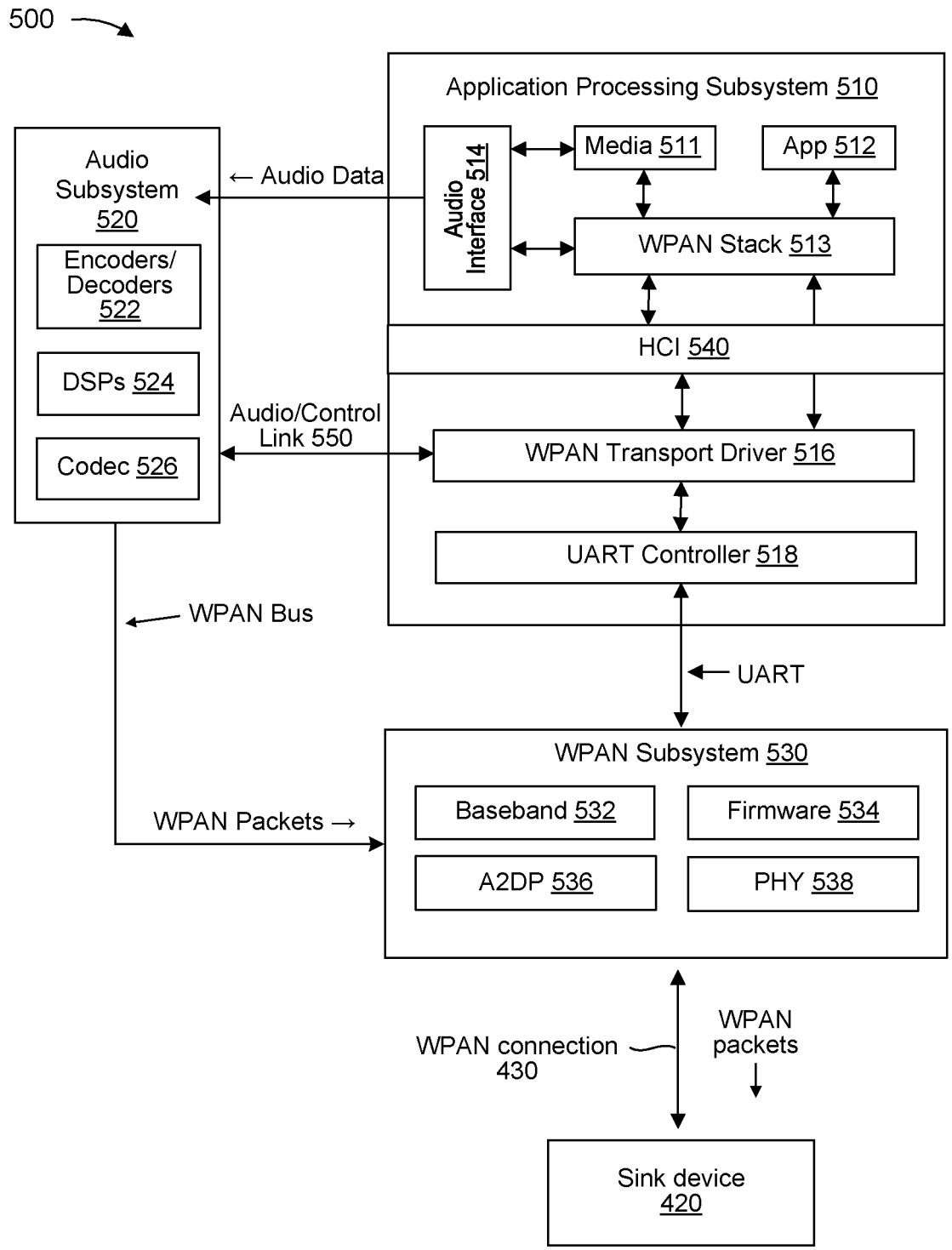
FIG. 5 is a diagram illustrating an example of a wireless communication device, in accordance with the present disclosure.

FIG. 5 is a diagram illustrating an example 500 of a wireless communication device 500, according to the present disclosure. In some aspects, the wireless communication device 500 may be an example of the central device 102 in FIG. 1, the wireless communication device 200 in FIG. 2, or the source device 410 in FIG. 4. In example 500, the wireless communication device 500 is depicted as having an established WPAN connection 430 (e.g., a Bluetooth communication connection) with the sink device 420 in FIG. 4.

The wireless communication device 500 may include an application processing subsystem 510, an audio subsystem 520, a WPAN subsystem 530, and an HCI 540. The application processing subsystem 510, which may correspond to at least some portions of the application layer 310 and the host layer 320 of the protocol stack 300 of FIG. 3, is shown to include a media player 511, an application layer 512, a WPAN stack 513, and an audio interface 514. The media player 511 can be any suitable device or component capable of generating or receiving multimedia content including, for example, real-time audio streams, real-time video streams, real-time gaming streams, and/or latency-sensitive traffic, among other examples. The application layer 512, which may be one implementation of the application layer 310 of FIG. 3, includes at least one Bluetooth profile that defines the collection of attributes and associated permissions to be used in Bluetooth or BLE communications. In some aspects, the application layer 512 may include processing resources including, for example, the memory 206, the ROM 208, and/or the flash memory 210 of FIG. 2. The WPAN stack 513 may be one implementation of the protocol stack 300 of FIG. 3.

In some aspects, as shown in FIG. 5, the application processing subsystem 510 may include a WPAN transport driver 516, which may include a split audio and packetization module (not shown for simplicity) that can packetize data (such as audio and/or video data) into Bluetooth frames that can be transmitted to the sink device 420 using a Bluetooth and/or BLE protocol. In some aspects, the WPAN transport driver 516 may be connected to the audio subsystem 520 via an audio and control link 550. In some aspects, the audio and control link 550 may be used to send encoded audio/video data and control signals between the WPAN transport driver 516 and audio/video DSPs within the audio subsystem 520. The WPAN transport driver 516 is also connected to a universal asynchronous receiver-transmitter (UART) controller 518 that provides controls for transmission of information via the WPAN connection 430.

The audio subsystem 520 may include encoders/decoders 522, one or more DSPs 524, and one or more codecs 526. The encoders/decoders 522 may be used to sample audio/video data extracted from one or more packets received from another wireless communication device. The extracted audio/video data may be processed in the application processing subsystem 510 based at least in part on the Bluetooth profile. In some implementations, the encoders/decoders 522 may partition the sampled audio/video data into payloads that can be embedded within one or more Bluetooth packets for transmission to the sink device 420 over the WPAN connection 430. In some instances, the DSPs 524 and/or the codecs 526 may employ one or more encoding or decoding algorithms in conjunction with sampling the audio data.

The WPAN subsystem 530 may include a baseband component 532 (e.g., a Bluetooth baseband component), a firmware component 534, an A2DP component 536, and a PHY component 538. The baseband component 532 and the firmware component 534 may be used to generate baseband signals for constructing and deconstructing data frames based on the Bluetooth or BLE protocol. The baseband component 532 and the firmware component 534 may also be used to generate carrier signals for up-converting baseband signals during data transmissions and for down-converting received data signals to baseband. The A2DP component 536 may be used to control or manage an A2DP link between the wireless communication device 500 and the sink device 420. Specifically, when the WPAN subsystem 530 is in a receive mode, the PHY component 538 can be used to receive, demodulate, and down-convert data packets received over the WPAN connection 430, and to forward the data packets to the application processing subsystem 510. When the WPAN subsystem 530 is in a transmit mode, the PHY component 538 can be used to encapsulate data provided from the upper layers into one or more Bluetooth frames or packets for transmission to the sink device 420 over the WPAN connection 430.

Communications may be target wake time (TWT)-based with synchronized end-to-end (E2E) timing. TWT involves the use of a schedule for waking up to communicate and powering down to conserve power.

As indicated above, FIG. 5 is provided as an example. Other examples may differ from what is described with regard to FIG. 5.

Figure 6:
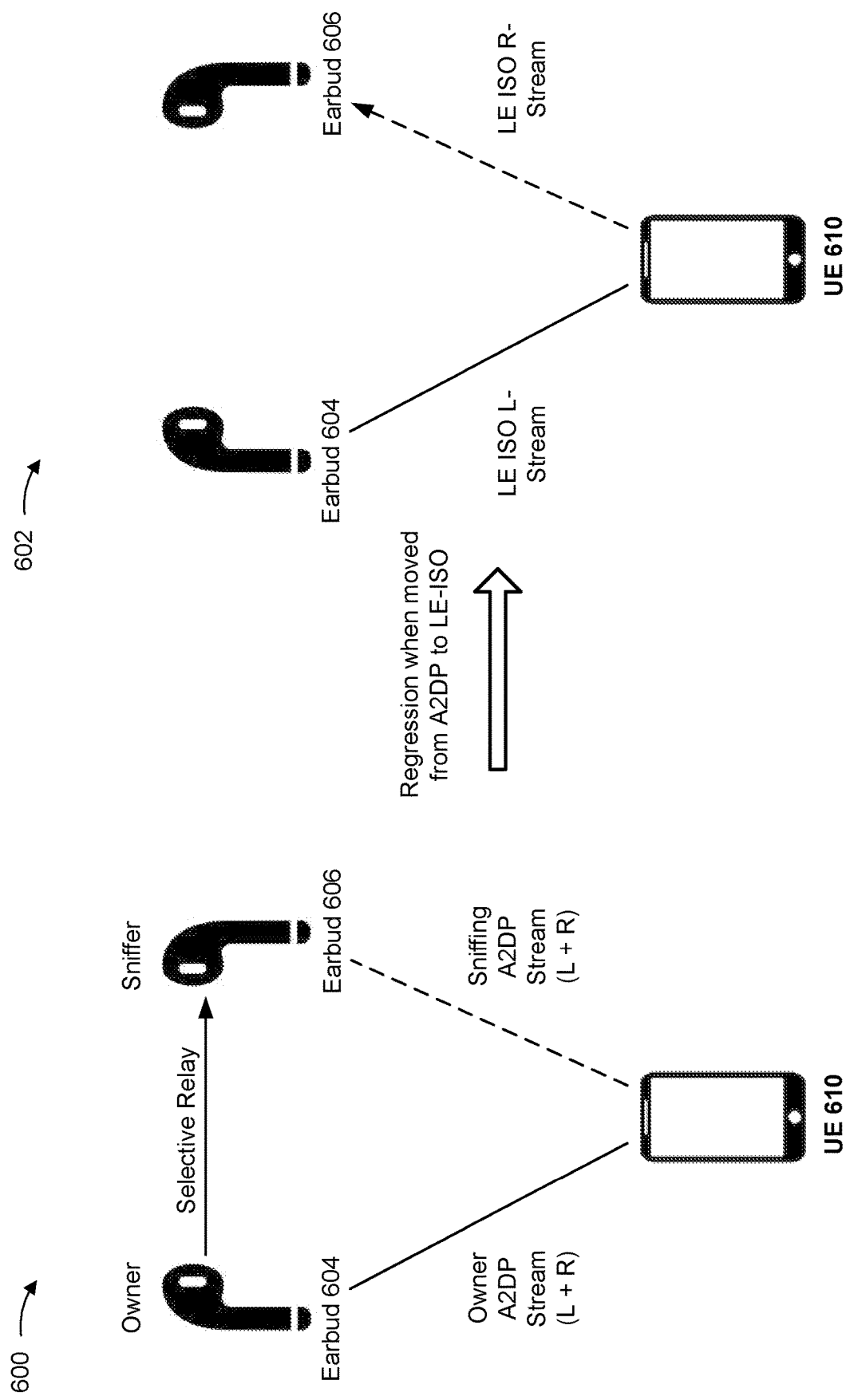
FIG. 6 is a diagram illustrating examples of audio streams, in accordance with the present disclosure.

FIG. 6 is a diagram illustrating examples 600 and 602 of audio streams, in accordance with the present disclosure. Example 600 shows a UE 610 that operates with a first earbud 604 (e.g., peripheral device 110) and a second earbud 606 (e.g., peripheral device 110) that are paired together. UE 610 may support a peripheral link, such as a basic rate (BR)/enhanced data rate (EDR) Bluetooth® audio link (BREDR), a Bluetooth® low energy (BLE) link, an advanced audio distribution profile (A2DP) link, or a proprietary link with the first earbud 604 and/or the second earbud 606.

When UE 610 operates with the pair of earbuds 604 and 606, earbud 604 takes on a primary role (P-bud), and earbud 606 takes on a secondary role (S-bud). Note that either earbud may take on the primary role or the secondary role. Earbud 604, as a primary earbud in the primary role, may connect to UE 610 over a peripheral link (e.g., relay piconet), such as an A2DP link. Earbud 604 may connect to earbud 606 over a selective relay link. Earbud 606, as a secondary earbud in the secondary role, may sniff the link between UE 610 and earbud 604 to receive packets that use an audio/video distribution transport protocol (AVDTP) or an eSCO protocol. Earbud 604 and earbud 606 may use the relay piconet between them to relay voice data or microphone data. Earbud 606, in the secondary role, may not connect to UE 610 on a peripheral link. In some designs, earbud 604 may relay, to earbud 606, all of the audio data packets or all of the audio data packets that pertain to earbud 606 (e.g., right audio or left audio).

Voice pickup quality is highly challenged in an earbud form-factor. The two microphones in an earbud are far from the mouth and are physically close together, limiting a 2-microphone clear voice capture (CVC) algorithm approach to get best in class performance.

In some aspects, a secondary earbud (e.g., earbud 606) may transmit its microphone (MIC) data to a primary earbud (e.g., earbud 604). Earbud 604 may then combine its MIC data and earbud 606's MIC data, to construct an eSCO frame to send to a central device (e.g., UE 610). Using MIC data from both sides of the head is anticipated to improve the voice pickup performance, as there is a good degree of separation from the other microphones for providing improved noise suppression processing.

Earbud 604, the primary earbud that is directly getting the packets from the UE 610, providing acknowledgements (ACKs) for the packets, and responding to the UE 610 may be considered an owner earbud. Earbud 606 is considered to be a sniffer earbud because earbud 606 is the secondary earbud that is sniffing the packets from the UE 610 (stream not registered and not providing ACKs to the UE 610) and getting the missed packets from the owner bud.

Example 600 shows UE 610 transmitting joint stereo over ISO to earbud 604 as an owner A2DP stream with both a left earbud stream (L) and a right earbud stream (R), or an owner (L+R) stream. Earbud 606 is receiving packets for earbud 606 by a selective relay and sniffing the owner (L+R) stream. Both earbuds may receive L+R audio packets, and this allows for stereo audio and/or spatial audio.

Example 602 shows a regression use case with an LE connected ISO for BREDR-A2DP based music streaming.

Earbud 604 gets the L-stream and earbud 606 gets the R-stream. Example 602 may not provide spatial audio.

As indicated above, FIG. 6 is provided as an example. Other examples may differ from what is described with regard to FIG. 6.

Figure 7:
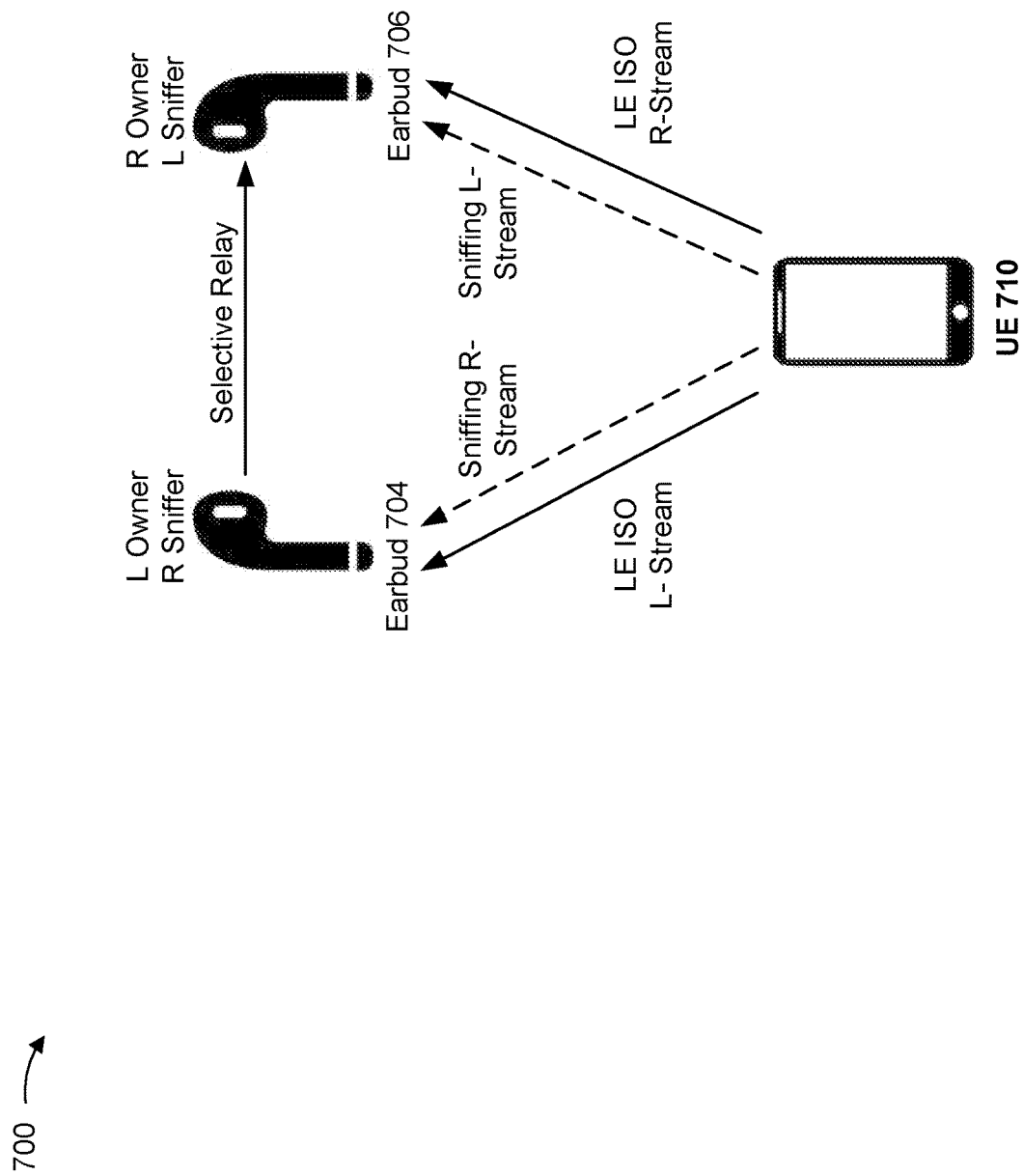
FIG. 7 is a diagram illustrating an example of audio streams, in accordance with the present disclosure.

FIG. 7 is a diagram illustrating an example 700 of audio streams, in accordance with the present disclosure. The earbud scenario of example 600 of FIG. 6 is mirrored to example 700 of FIG. 7.

In some aspects, an earbud may mirror the stream of another earbud. With mirroring, a sniffing earbud may receive UE traffic to an owner earbud via sniffing and relays from the owner earbud. In some aspects, both earbuds may mirror each other by sniffing each other's stream and obtaining packets missed from the stream via relay. For example, earbud 704 may own the L stream but may sniff the R stream. Earbud 706 may own the R stream and may sniff the L stream.

Mirroring may involve three parts, sniffing, relay, and channel access. Once all the essential information required to sniff a link (e.g., the link access code, frequency hopping information, encryption key, packet counter) is received by the sniffer earbud, in some aspects, the sniffer earbud may align its packet counter as the sniffer earbud sniffs the packets. From time to time, the owner earbud may synchronize with the sniffer earbud to receive information about which packets the sniffer earbud has missed while sniffing. This synchronization may be referred to as a "sync-up handshake." After the sync-up handshake, there is a relay (buddying) of the missing packets. While the payloads of packets for relays belong to missed packets, protocol data unit (PDU) header information may be specified. For the sync-up followed by relay, the earbuds may use a channel access mechanism.

The UE may encrypt packets for the owner earbud with a key. The packets are received and decrypted by the owner earbud and the sniffer earbud. When a packet is missed by the sniffer earbud (because of a CRC error, a decryption error, or any other error), the packet is relayed by the owner earbud to the sniffer earbud. Relayed packets may or may not be encrypted, depending on whether the relayed packets are part of buddy communications between the earbuds and are intended to be encrypted. A sync-up handshake may or may not be encrypted, independent of whether relayed packets are encrypted.

The sniffer earbud decrypts the packets with the key and increments its own sniffer counter with each decrypted packet. The sniffer earbud is expected to increment the sniffer counter in alignment with the owner counter. If a packet is not decrypted, the packet is not successful and the owner earbud has to relay the packet. The higher the error rate, the higher the relay load on the owner earbud. Therefore, the alignment of the counters can reduce the relay load.

As indicated above, FIG. 7 is provided as an example. Other examples may differ from what is described with regard to FIG. 7.

Figure 8:
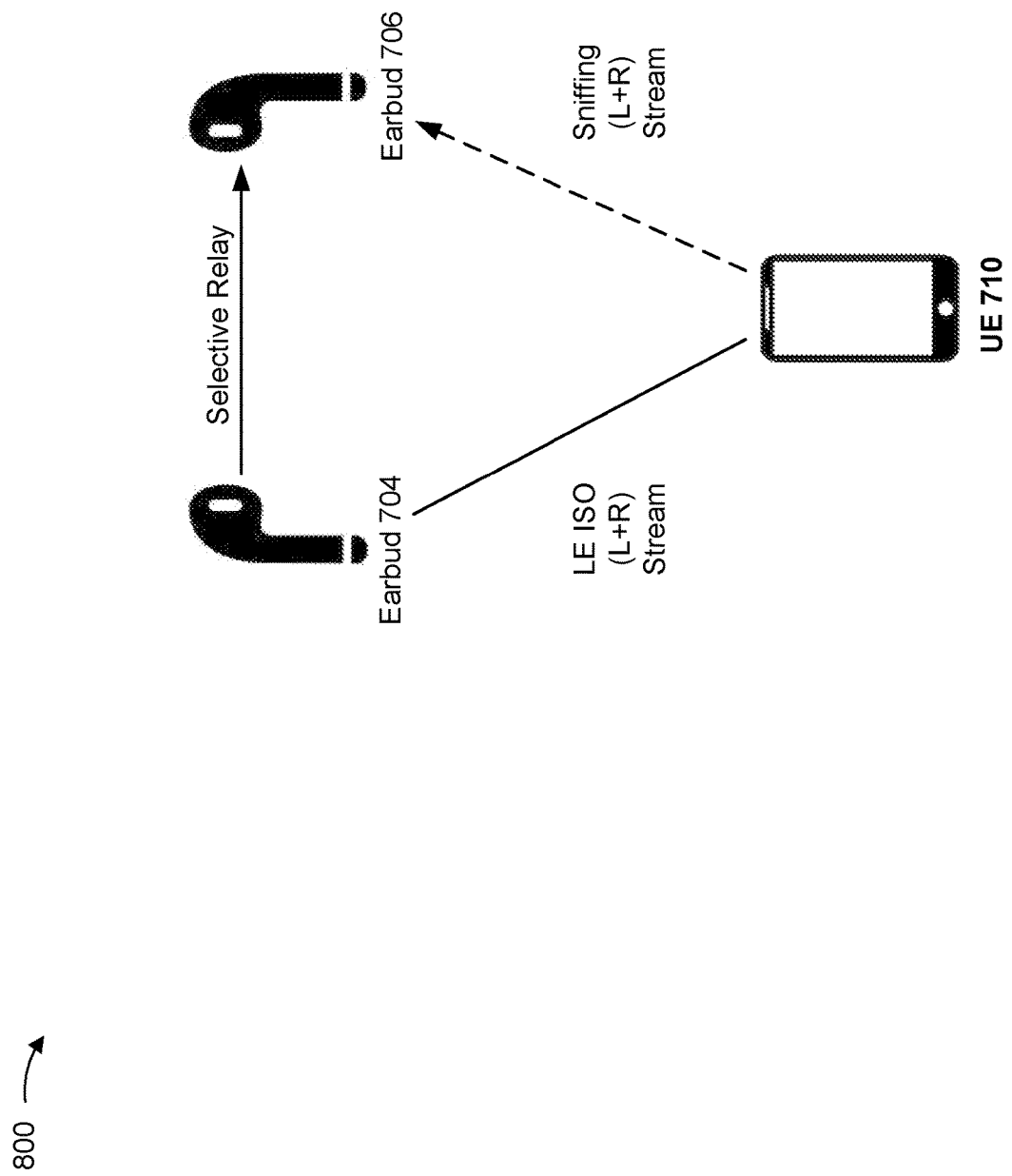
FIG. 8 is a diagram illustrating an example of audio streams, in accordance with the present disclosure.

FIG. 8 is a diagram illustrating an example 800 of audio streams, in accordance with the present disclosure.

Example 800 is similar to an A2DP over BREDR case or example 600, except that the L and R audio streams are sent using an ISO link. The owner audio stream is a joint (L+R) stream, and earbud 706 sniffs the joint (L+R) stream to provide for spatial audio. Earbud 704 may relay packets that earbud 706 missed while sniffing.

A difference between example 600 and example 800 is that, for example 800, the latency is guaranteed and the link is flushable while, for example 600, the latency is not guaranteed and the link is not flushable. In example 600, the UE 610 may retransmit the same packet 10-20 times (if no ACK is received from the earbud). This increases latency if there are environmental problems. "Flushable" means that the UE 710 may retransmit the packet a limited number of times (e.g., 2-3 times) before that packet is flushed and the earbud moves onto the next packet. This helps to avoid the latency introduced by a high number of retransmissions. In example 800, the packet sniffing and relay is performed in time as there is a time-to-play for each packet before the packet is of no use.

As indicated above, FIG. 8 is provided as an example. Other examples may differ from what is described with regard to FIG. 8.

Figure 9:
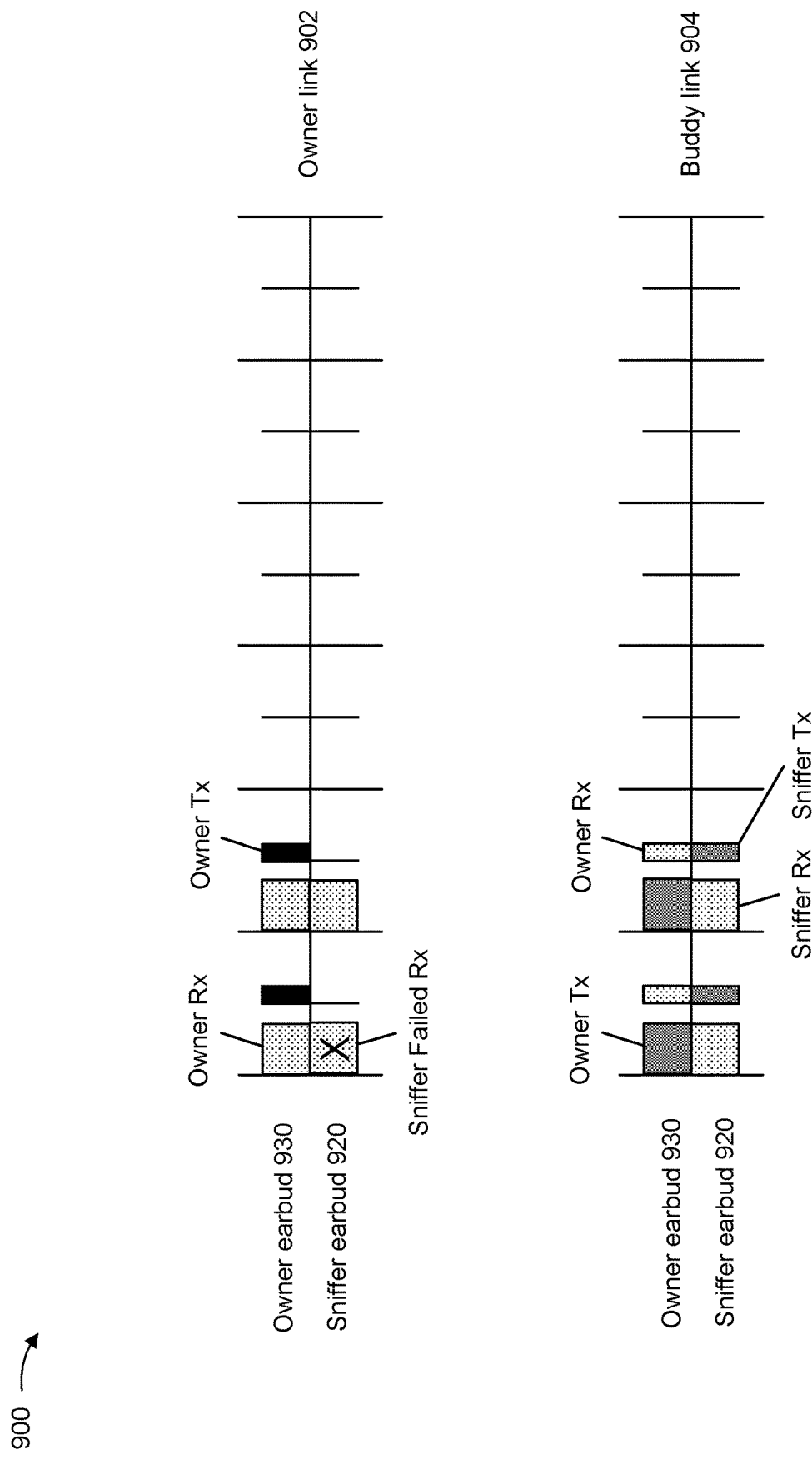
FIG. 9 is a diagram illustrating an example of audio streams, in accordance with the present disclosure.

FIG. 9 is a diagram illustrating an example 900 of audio streams, in accordance with the present disclosure. Example 900 shows an owner link 902 (e.g., connected isochronous stream (CIS) link) for an owner earbud 930 and a "buddy" link 904 for a sniffer earbud 920. Each link may be an ISO link and may include multiple slots of an ISO interval. Each link may be periodic.

In some aspects, the buddy link 904 may have subevents that are aligned with the owner link 902. In the case of an interleaved mode, there would be subevents of another stream in between and those are not shown. The buddy link 904 may have extended subevents. For example, the sniffer may sniff packets in subevents. There may be subevents in the interval that are available after the packet transmissions to use for synchronizing and relay missed packets.

There may be subevents of a post CIS event for a sequential mode or subevents of a post connected isochronous group (CIG) event for an interleaved mode. Extended subevents may also be interleaved. Darker boxes may indicate transmissions, and lighter boxes may indicate receptions. An "X" on a reception may indicate a failed reception.

As indicated above, FIG. 9 is provided as an example. Other examples may differ from what is described with regard to FIG. 9.

Figure 10:
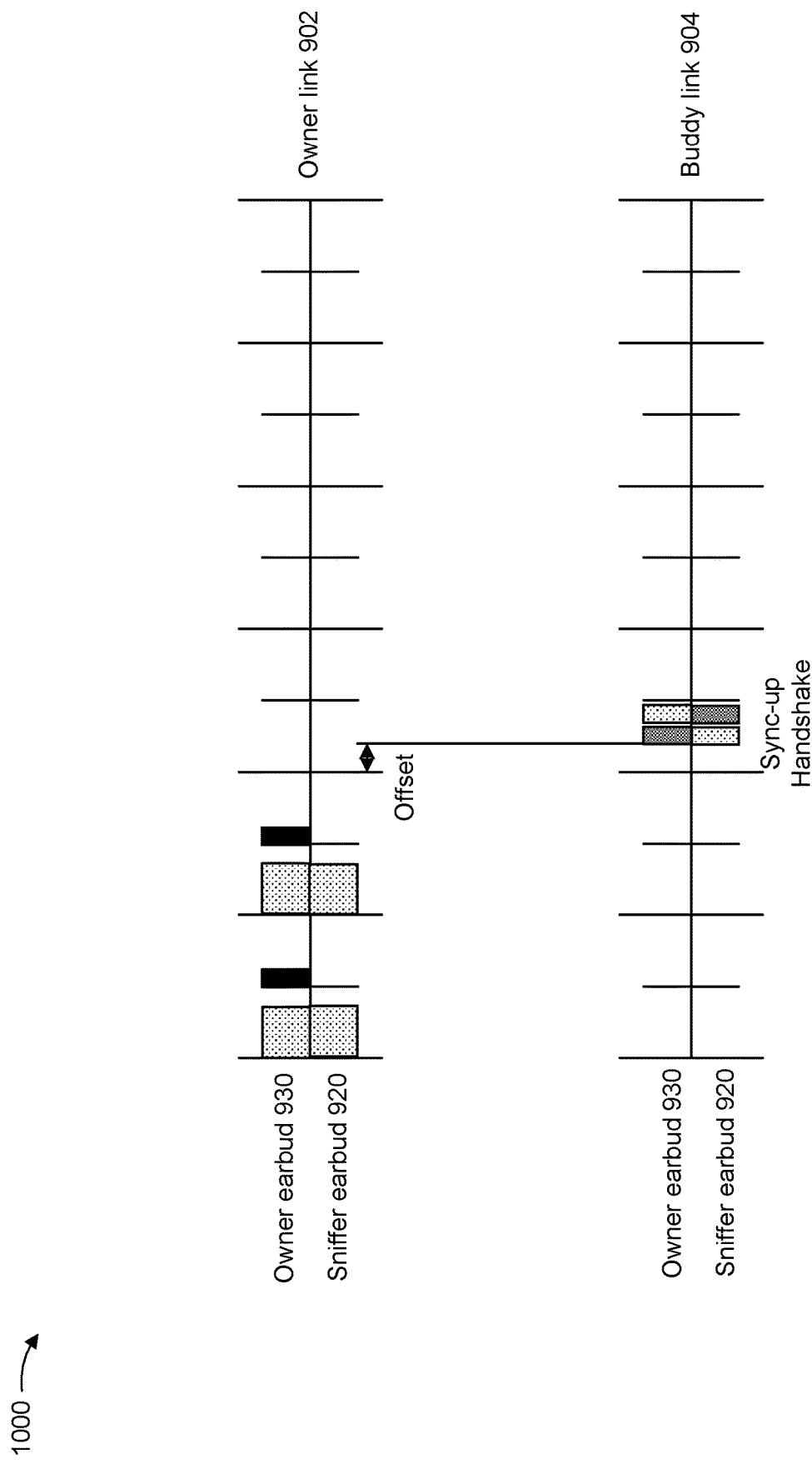
FIG. 10 is a diagram illustrating an example of a sync-up handshake, in accordance with the present disclosure.

FIG. 10 is a diagram illustrating an example 1000 of a sync-up handshake, in accordance with the present disclosure.

The UE may transmit a set number of packets in each period. In some aspects, the sniffer earbud 920 may sniff audio packets and then detect a transmission gap (e.g., an offset from a subevent boundary of, for example, 150-200 microseconds (μs)). There may be a transmission gap if there are no more packet transmissions for an interval and the stream is flushed (retransmissions aborted). If there is a transmission gap (e.g., no packets for at least the offset), the owner earbud 930 may transmit a synchronization packet, and the sniffer earbud 920 may detect a synchronization is to occur. The sniffer earbud 920 may synchronize with the owner earbud 930. The owner earbud 930 may initiate a sync-up handshake. In some aspects, the sync-up handshake may involve the owner earbud 930 transmitting a synchronization packet and the sniffer earbud 920 transmitting a response. The owner earbud 930 may indicate what packets have been received, and the sniffer earbud 920 may determine from the indication whether the sniffer earbud 920 has sniffed all of the packets and that there will be no packets to be relayed. A maximum offset may be the extra time in a subevent left after the sync-up handshake.

As indicated above, FIG. 10 is provided as an example. Other examples may differ from what is described with regard to FIG. 10.

Figure 11:
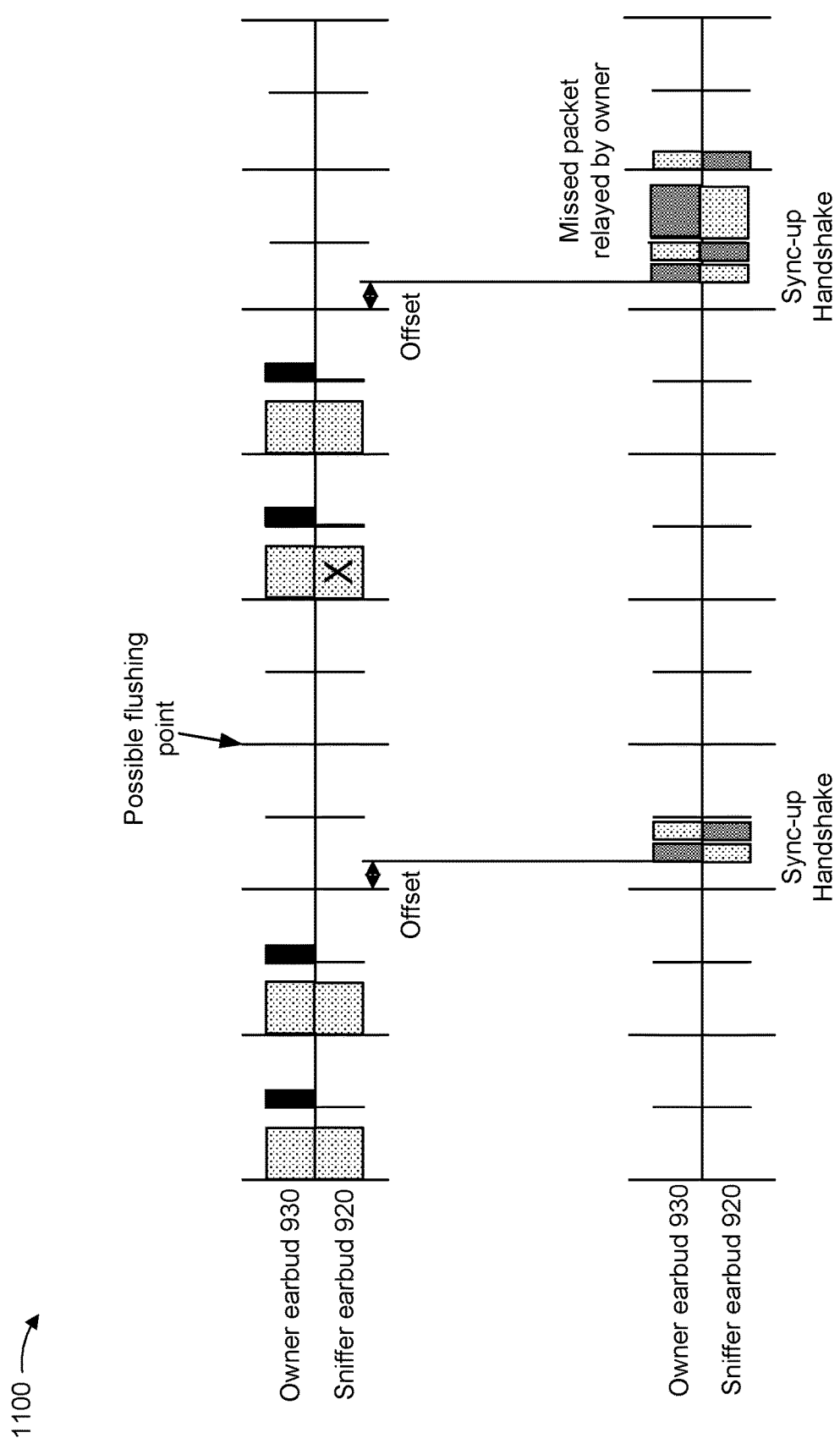
FIG. 11 is a diagram illustrating an example of a packet relay, in accordance with the present disclosure.

FIG. 11 is a diagram illustrating an example 1100 of a packet relay, in accordance with the present disclosure.

In some aspects, a synchronization packet may be encrypted using an ISO interval number (event counter). Synchronization packets may not have a MIC included to shorten the length, thereby reducing the synchronization exchange time to fit in an ISO subevent. Relay packets may be encrypted and have a MIC. Encryption may be performed by the UE for the packet using a packet counter for the packet when transmitted to the owner earbud. Example 1100 shows a packet relay after a sync-up handshake. The relay transmission and reception may occur at a subevent boundary.

In some aspects, the owner earbud 930 may indicate what packets have been received, and the sniffer earbud may determine from the indication whether the sniffer earbud has sniffed all of the packets and that there will be no packets to be relayed. In some aspects, the indication may be an owner bitmap of received packets. The sniffer earbud may receive the bitmap and transmit an ACK for the bitmap. During a relay session, the owner earbud may relay missed packets in order. Once the first relay is received (with or without CRC error), the sniffer earbud may stop listening for the sync-up handshake until the relay session is over.

The sniffer earbud may listen for the owner earbud at the subevent boundary until a synchronization packet is received from the owner earbud. After the synchronization packet is received, the sniffer earbud may listen to the owner earbud for relay packets at the subevent boundary. The sniffer earbud may listen at an offset for the sync-up handshake if the sniffer earbud is free at the offset.

In some aspects, before any relay starts, there may be a sync-up. The sync-up may involve a sync-up handshake with the owner earbud transmitting a synchronization (SYNC) packet and the sniffer earbud responding. With each sync-up, there may be a relay session. The SYNC may not be ACKed and thus may not have a valid SN. The sniffer earbud may respond back with a response message only when the sniffer earbud receives the SYNC without a CRC error. The owner earbud may move to a relay session after successfully receiving the SYNC. Alternatively, the sniffer earbud may ACK the SYNC and respond even when the sniffer earbud received the SYNC with a CRC error. The owner earbud may move to the relay session after receiving the ACK and the sniffer earbud response message. Each interval may have a sync-up.

The relay session may not contain any relay when the sniffer earbud has received all of the packets as per the sync-up handshake (referred to as an "empty relay session"). Each sync-up may reset the information of the packets to be relayed. That is, based at least in part on the recent sync-up, the relay packets and their order is decided. No information may be carried from a previous interval relay session.

There can be multiple sync-up handshakes in a connection interval, which means that both the owner earbud and the sniffer earbud may return to the UE's CIS link after the sync-up. The owner earbud may return to the UE's CIS link after receiving an ACK of the last relay sent. The sniffer earbud may return to the UE's CIS link after sending an ACK to the last relay and there is no retransmission from the owner earbud in the next subevent. Devices may terminate the relay session using a close isochronous event (CIE) bit. After a gap, the owner earbud may start receiving packets from the UE and then perform another sync-up. The owner earbud may relay then missing packets. The missing packets may be packets with life remaining and that have not been flushed.

Relay communications may include header bits for the relayed packets. Header bits may include a CIE bit to indicate closure of a relay session and/or a null PDU indicator (NPI) to indicate closure of another stream's relay session, to allow usage of the other stream's subevents for the relay session of the current stream. The header may include a sequence number (SN) bit used by the owner that represents the SN of the relays. First relay transmission after the sync-up handshake may start with SN=0. The last packet transmitted in the previous relay session may have been with SN=1 but remain unacknowledged. That packet (if not flushed) may be a first packet of the relay session and may be transmitted with SN=0.

The header may include a next expected sequence number (NESN) bit that indicates the NESN of the PDU that the relay transmitter (owner earbud) has for the other stream's session (where the earbud is the sniffer earbud). The above meaning of the NESN bit holds true when bidirectional relay is not enabled. That is, relays are either enabled from the owner-to-sniffer direction or from the sniffer to owner direction.

The two streams relay session synergize using NESN and NPI. An NPI bit used in current relay session indicates closure of the other streams' relay session. This helps in making use of each other stream's left-over subevents for the relay purpose. The owner earbud, after seeing or setting the NPI bit in the current stream, may start using the other stream's sub-events to transmit relay packets of the current stream (NPI bit can remain set for any subsequent relays). The sniffer earbud, after seeing or setting the NPI bit in the current stream, may start listening in the other stream's subevent to receive relays for the current stream. A relay packet transmission in the current CIS stream subevent may indicate its NESN for the other stream. This mitigates the effect of ACK loss between the buds.

In some aspects, earbuds may synergize two stream relay sessions using free bandwidth. For example, a right earbud is sniffing an L stream and identifies, during a sync-up all of the L stream packets are sniffed. However, the left earbud has not sniffed packets from the R stream and relay begins. Because the channel or subevents belonging to the L stream are free (due to no relay needed), the right earbud may use the left earbud subevents for the relaying of the missed R stream packets.

In some aspects, earbuds may join L and R stream relay sessions into a joint relay session. For example, the left earbud (owner) may relay L stream packets to the right earbud (sniffer) and receive ACKs. However, instead of receiving just ACKs, the right earbud may instead relay packets of the R stream. This may involve changing a length of the subevents or use a high data rate layer for joint relaying in a single subevent.

In some aspects, in a joint relay session, when the subevent length is long enough to fit a relay transmission and a relay reception using a high speed physical layer, both of the earbuds may transmit their relay in the same subevent. When the subevent length is too short, relays are given priority in the order of their relay life. For example, PDUs that cannot be relayed in the next interval may be relayed first. PDUs that cannot be sent in the interval after may be relayed next. Within a set of PDUs selected for the relay based on their relay life, a synchronization initiator may transmit all of its relay packets first, followed by the reception of all of the relay packets from the synchronization responder. Alternatively, the synchronization initiator may alternate between transmitting and receiving relay packets.

In some aspects, for a joint relay session, the owner earbud may transmit a joint bitmap of both the streams. The owner earbud may send its owner bitmap when the owner earbud expects to synchronize with the sniffer earbud. The owner bitmap may include a bitmap of the other earbud's streams where the owner earbud is a sniffer earbud. The sniffer earbud may respond with its sniffer bitmap. If the sniffer earbud expects to synchronize with the other stream where the sniffer earbud is the owner earbud of that other stream, the sniffer earbud may include an owner bitmap along with the sniffer's bitmap for the other stream where the sniffer earbud is the owner earbud. When the owner earbud sends a joint bitmap and successfully receives the sniffer's joint bitmap, a two-stream joint relay session may be established over the remaining subevents. In a joint relay session, the joint synchronization bitmap initiator may transmit first followed by a response from the joint synchronization bitmap responder.

In some aspects, the flush timeout may be extended for the purpose of relay for additional robustness. The end-of-life of the packet may be sufficient but cannot be relayed. The earbuds may extend the end-of-life of a burst for relay, such as from 3 to 5 subevents long to perhaps 4 to 7 subevents long. The packets may be played 6 subevents later rather than 3 subevents later.

In some aspects, the sniffer earbud may trigger the owner earbud for a sync-up. The end of life for a current packet may cause the owner earbud to relay current packets of the interval (going to be flushed) to be handled before caring for future packets. In some aspects, when the owner earbud determines that there are packets yet to be tallied with no chance to be relayed in the next interval (i.e., this is the last interval where the packets can be relayed), the owner earbud may start synchronization immediately and only for the packets that are urgent to be tallied. When the owner earbud has received all of the packets that the UE could have sent in the current interval, the owner earbud may initiate synchronization. When the owner earbud does not hear from the UE for a set of subevents, the owner earbud may initiate synchronization.

In some aspects, a relay session may use an overlapping mode. The left channel subevents and the right channel subevents may be used in an interleaved mode (alternating odd and even) or a sequential mode (multiple consecutive subevents for the same channel each time). The L subevents and the R subevents may, in overlapped mode, overlap (interleaved or sequential) to help the L stream and R stream to be transmitted (rather than L subevents and R subevents being independent). That is, there is a contiguous set of subevents that could be used for whichever stream, as per the scheduling decision made by the UE (e.g., which could be based on performance of the L and R streams). The missed packets may be transmitted using available subevents among the L subevents and the R subevents. However, the sniffing earbud does not know whether a subevent is for L or R, so there may not be some sniffing in the overlapped mode. The packets may have to be relayed.

In some aspects, the relay may be bidirectional relay. For robustness at the owner earbud, the sniffer earbud may relay packets to the owner that have been sniffed by the sniffer earbud but not received by the owner. This may help when packets would be flushed before being successfully received by the owner on the owner stream from the UE. In some aspects, it may be specified whether the owner relays first or the sniffer relays first.

In some aspects, for purposes of robustness, the representation point for the PDUs to be flushed in the current interval may be shifted to a later interval. This will cause additional latency but will provide robustness. This additional life for the PDUs beyond a flushing timeout (FT) at a flushing point may be referred to as a "flush timeout extension" (FTE). The FTE can be configured between the earbuds using a lower layer PDU. In this case, a synchronization maximum bitmap size may be (FT+FTE)×bit number (BN) bits.

In some aspects, there may be a joint relay session in an overlapping mode. An owner earbud, when expecting synchronization, may start transmitting a joint bitmap in odd-numbered subevents if the owner earbud is the owner of CIS-1 and in even-numbered subevents if the owner earbud is the owner of CIS-2. The owner earbud may start listening for the synchronization bitmap in the alternative subevents (even-numbered for CIS-1 and odd-numbered for the CIS-2). A sniffer earbud expecting synchronization (e.g. expecting to obtain packets that cannot be relayed in the next interval) starts listening for the synchronization in odd-numbered subevents if the sniffer earbud is the sniffer of CIS-1 and in even-numbered subevents if the sniffer earbud is the sniffer of CIS-2. The sniffer earbud may also start transmission for the synchronization bitmap in the alternative subevents (odd-numbered for CIS-1 and even-numbered for the CIS-2).

That is, when for an earbud, a situation for synchronization is triggered, irrespective of being an owner earbud or a sniffer earbud, the earbud may start both transmission and reception for the synchronization bitmap in alternative subevents. In some aspects associated with improvisation, since a synchronization bitmap is transmitted or received at an offset, the owner earbud or the sniffer earbud, before performing a sync-up handshake, may sniff to the UE for the peer-owned stream packet (except when the sub-event is exclusively self-owned). The sniffer earbud may continue to transmit or receive a bitmap in the case of a synchronization timeout or abort reception of a UE's retransmission.

The total number of subevents for numbering may be overlapping subevents+2*number of non-overlapping subevents, the subevents numbered starting from 1. In case of non-overlapping subevents, CIS-1 may be identified as the stream which has the first non-overlapping subevent. CIS-2 may be the other stream. In case of no-non-overlapping sub-events (type-3), CIS-1 is the L-stream and CIS-2 is the R-stream. The CIS-1 owner may transmit a synchronization bitmap in subevents numbered as 1, 3, 5 . . . . The CIS-1 sniffer may listen for the synchronization bitmap in the numbered subevents. The CIS-2 owner may transmit a synchronization bitmap in subevents numbered as 2, 4, 6, and so forth. The CIS-2 sniffer may listen for a synchronization bitmap in these numbered subevents.

In an example scenario, a packet is not received by the owner earbud by the time the packet is flushed by the UE, but the packet is received by the sniffer earbud. In some aspects, the sniffer earbud may relay the packet to the owner earbud. When both owner-to-sniffer relay and sniffer-to-owner relay are enabled, then the streams' relay sessions are considered to be a bidirectional relay session. If the subevent length permits relay in both directions, then both the owner earbud and the sniffer earbud may relay packets in their respective ascending order of packet counters. Otherwise, a first sniffer-to-owner relay is performed followed by an owner-to-sniffer relay. Each device relays in the ascending order of the packet counter.

In some aspects, there may be an order in the joint bidirectional relay session. First, both of the earbuds may finish relays as per the sniffer's role. If the subevent length does not allow for simultaneous relay, the synchronization initiator and responder may alternate for the relay. When one earbud has completed its sniffer's role relay, then the other earbud may start sending relays continuously. Alternatively, the first one of the earbuds may finish its relays and then the other earbud may finish its relays. After the sniffer's role relays are completed, the earbuds may start sending their relays as per the owner's role with the same set of rules.

In some aspects, the earbuds may dynamically select the subevent length for a joint session to allow the flow of maximum length PDUs in each direction plus 300 microsecond (µs) for the interframe space (T_IFS) between two consecutive packets. T_IFS time may decrease due to advances in hardware technology. T_IFS time may refer to the time between Tx followed by Rx (or Rx followed by Tx) and its standard value is 150 µs. Another 150 µs may be expected to be used after the Rx if Tx was first (i.e., a time gap before activity on the next subevent starts). The earbuds may use extended subevents (beyond the CIG event) in each interval if there is space at both of the earbuds. The number of extended subevents may be negotiated between the two earbuds.

As indicated above, FIG. 11 is provided as an example. Other examples may differ from what is described with regard to FIG. 11.

Figure 12:
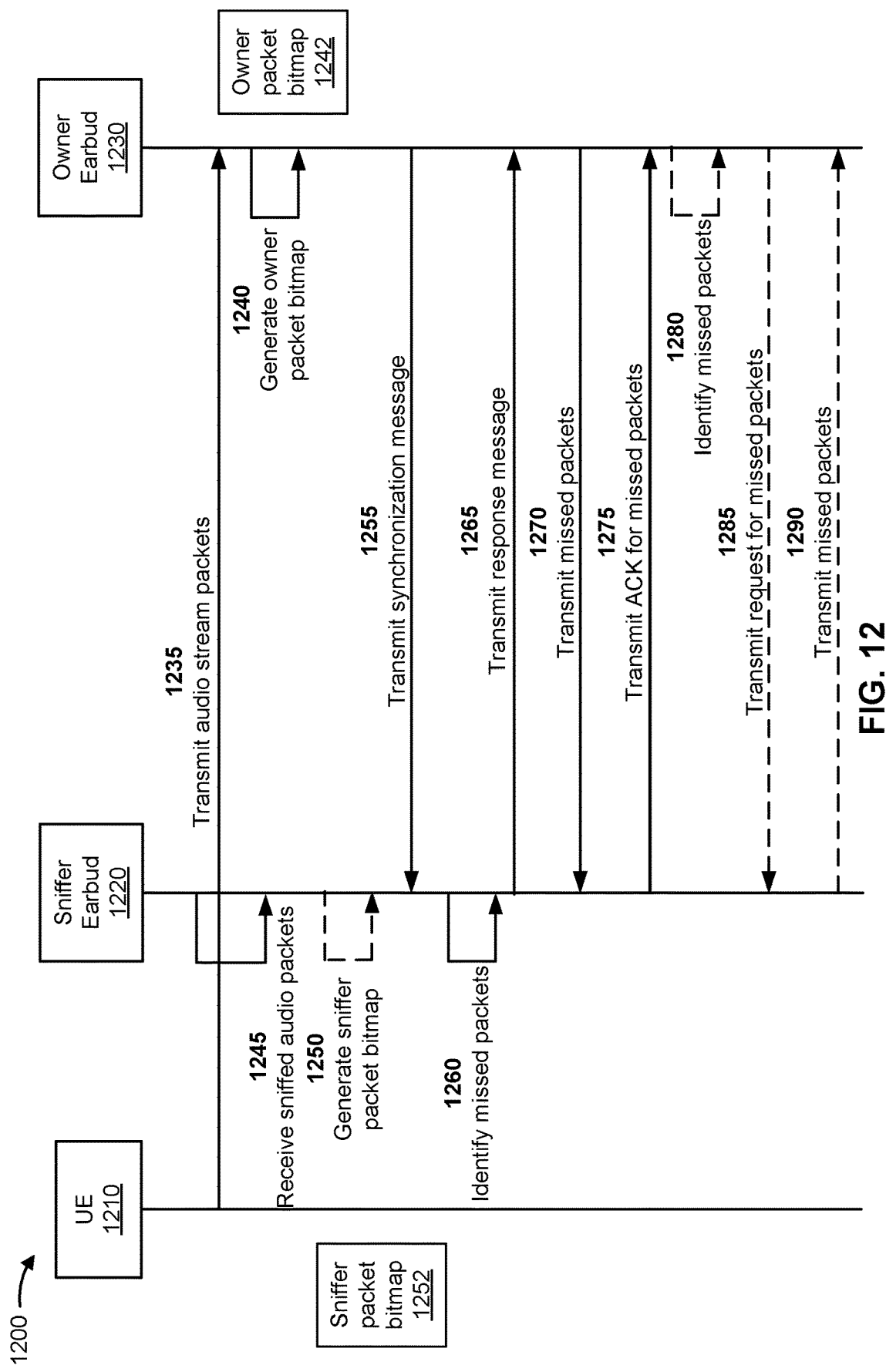
FIG. 12 is a diagram illustrating an example associated with audio streams, in accordance with the present disclosure.

FIG. 12 is a diagram illustrating an example 1200 associated with audio streams, in accordance with the present disclosure. Example 1200 shows a UE 1210 (e.g., wireless communication device 200 as a central device) that may transmit an owner audio stream to an owner earbud 1230 (e.g., wireless communication device as a peripheral device). The audio stream may be on an ISO link. Sniffer earbud 1220 (e.g., wireless communication device 200 as a peripheral device) may sniff the owner audio stream.

As shown by reference number 1235, the UE 1210 may transmit audio stream packets. As shown by reference number 1240, the owner earbud 1230 may generate an owner packet bitmap 1242 of receive packets. As shown by reference number 1245, the sniffer earbud 1220 may sniff the audio stream packets (receive sniffed audio packets). As shown by reference number 1250, the sniffer earbud 1220 may, alternatively or additionally, generate a sniffer packet bitmap 1252 of sniffed packets.

As shown by reference number 1255, the owner earbud 1230 may transmit a synchronization message. The synchronization message may include the owner packet bitmap 1242 (or an indication of the owner packet bitmap). The owner earbud 1230 may transmit the synchronization message an offset after a synchronization timeout, an out-of-transmission event, a determination that packets are no longer expected from the UE 1210, and/or a determination that synchronization with the sniffer earbud 1220 is expected (e.g., necessary).

As shown by reference number 1260, the sniffer earbud 1220 may identify missed packets. The sniffer earbud 1220 may identify the missed packets from the owner packet bitmap 1242. As shown by reference number 1265, the sniffer earbud 1220 may transmit a response message. The response message may indicate the missed packets. In some aspects, the sniffer earbud 1220 may indicate the missed packets by including the sniffer packet bitmap 1252 or a portion of the sniffer packet bitmap 1252 in the response message. The response message may indicate that the synchronization message was successful.

Relay may be enabled between the earbuds. As shown by reference number 1270, the owner earbud 1230 may transmit the missed packets. The owner earbud 1230 may transmit the missed packets (relayed packets) as part of a relay mode. The relay mode may or may not include encryption. As shown by reference number 1275, the sniffer earbud 1220 may transmit an ACK (or a negative ACK (NACK)) for the missed packets the sniffer earbud 1220 received from the owner earbud 1230. The next relay may then occur and so forth. The earbuds may provide all of the packets to the user of the earbuds, which may include providing spatial audio.

In some aspects, the owner earbud 1230 may seek to obtain packets the owner earbud 1230 may have missed. The relay session may involve a relay of packets from the sniffer earbud 1220 to the owner earbud 1230. As shown by reference number 1280, the owner earbud 1230 may identify packets missed from the owner audio stream. The owner earbud 1230 may identify missed packets based at least in part on a comparison of the owner packet bitmap 1242 and the sniffer packet bitmap 1252 (or other information from the sniffer earbud 1220). As shown by reference number 1285, the owner earbud 1230 may transit a request for packets missed by the owner earbud 1230. As shown by reference number 1290, the owner earbud 1230 may receive the missed packets. The owner earbud 1230 may transmit ACKs (or NACKs) for the received missed packets from the sniffer earbud 1220. The earbuds may obtain packets for both earbuds without any configuration changes at the UE 1210.

In some aspects, relay may be enabled (in a specific relay mode) only from the sniffer earbud 1220 to the owner earbud 1230. That is, the sniffer earbud 1220 may have no interest in the owner earbud's stream apart from providing additional robustness to the owner earbud 1230 by acting as an assistant device. In this case, the owner earbud 1230 may transmit a NULL packet if the owner earbud 1230 expects any relay. The sniffer earbud 1220 may respond back with a relay. The owner earbud 1230 may transmit an ACK. The sniffer earbud 1220 may transmit the next relay, if any, and so forth.

In some aspect, the owner earbud 1230 may relay (in a bidirectional relay mode) to the sniffer earbud 1220 and the sniffer earbud 1220 may also relay to the owner earbud 1230. In this mode, relays may first flow from the sniffer earbud 1220 to the owner earbud 1230. When relays in the sniffer-to-owner direction are completed, the relays may proceed from the owner earbud 1230 to the sniffer earbud 1220. The directions may vary in order.

The above relay modes may be related to a single stream relay session. This can be for the L stream, the R stream, or the L+R stream when the UE 1210 transmits joint stereo to one of the earbuds (or joint stereo to both of the earbuds). In some aspects, there may be a joint relay session mode where the UE 1210 is sending the L and R streams separately, one stream to each earbud or both of the streams to only one of the earbuds.

The mirroring solutions may work for different configurations, including for a single L+R stream (joint stereo) between the UE and the owner earbud or for a split CIG where there are two CISs between the UE and the owner earbud. For the split CIG case, the solutions may work irrespective of whether the earbuds are an owner of one CIS each or whether the owner earbud is the owner of both the CISs. The solutions may work for a standard coordinate set identification profile (CSIP) configuration where there is a single CIS with each earbud. The solutions may work for the overlapping mode.

In some aspects, the missed packets may be transmitted based at least in part on a quantity of packets that are able to be relayed in an interval and flushing time information (e.g., flushing points) for the quantity of packets. A bitmap may indicate whether packets are received or not received.

The bitmap may be for packets having flushing points in the current CIG event or the next CIG event. For example, a bit value of 1 may represent "received" (by UE or relay) and a bit value of 0 may represent "not received" (including yet to be transmitted packets). Zero length PDUs may not be relayed and may be marked as 0 in the bitmap. For example, if BN=2, a flush timeout (FT)=3, and a current CIG event number=1000, the bitmap may include information for 6 packets between the buds (others are not as useful as tool old or insufficient life remaining). The 6 packets may include 2 packets with flushing points in a $1000^{th}$ event, 2 packets with flushing points in a $1001^{st}$ event, and 2 packets with flushing points in a $1002^{th}$ event. Each interval bitmap may be prefixed with a rate indicator (for the PHY used) in order to extend the solution with adaptive BN cases.

Alternatively, in some aspects, the bitmap may be of N number of packets corresponding to the N flushing points (including the flushing points of the current interval). Starting interval number S may provide information about the first packet. When S=1, the bitmap may start with the packet that is corresponding to the first flushing point in the current interval. When S=BN+1, the bitmap may start with the packet corresponding to the first flushing point in the next interval. This may involve changing the number of packets that are relayed.

Since BN×FT is a reasonably small number, say for BN=4, FT=8, then BN×FT=32, which is 32 bits (4 octets) for the bitmap packet, optimization may not be necessary. However, in some aspects, the bitmap may be optimized. For example, the handshake packet may include a bitmap for BN×N packets, where N(≤FT) represents packets to be flushed in the current interval and a next N–1 intervals. N may be fixed or configurable (via handshake) or dynamic. When dynamic, N may be part of the synchronization packet.

In some aspects, starting interval number S may indicate that the bitmap starts with packets that are going to be flushed in the interval represented by S. For example, when S=1, the bitmap starts from the packets going to be flushed in the current interval. When S=2, the bitmap starts from the packets that are going to be flushed in the next interval. These optimizations will not only help in restricting the size of the bitmap but also limit the relay session scope, thereby providing another control for the relaying.

As indicated above, FIG. 12 is provided as an example. Other examples may differ from what is described with respect to FIG. 12.

FIG. 13 is a diagram illustrating an example 1300 of using a nonce for packet counters, in accordance with the present disclosure.

In some aspects, the owner earbud may maintain an owner counter for counting received packets and use a key associated with the owner counter to decrypt the packets. The sniffer earbud may use a sniffer counter for counting sniffed packets. For decryption to be successful, the owner counter and the sniffer counter are to be aligned. In some aspects, this alignment may involve the use of a nonce, such as a single nonce or a double nonce. For example, if a single nonce is supported, the next expected packet's nonce is set. If a double nonce is supported, the next expected packet's nonce is set and the following expected packet nonce is also set.

The earbuds may expect packets using a nonce, represented as $s(x)^1$ and $\bar{s}(x+1)$, where s is a first sequence number (SN), $\bar{s}$ is a second (next) SN, and x is a counter value. Over ISO, each packet has a one-bit SN, which toggles between 0 (zero) and 1. The nonce may work by the use of an s packet and an s packet, such as a SN=0 (zero) packet and an SN=1 packet. The UE may transmit an SN=0 packet to the owner earbud. The owner earbud may transmit an ACK if the SN=0 packet was successfully received. If the ACK is successfully received at the UE, the UE may transmit an SN=1 packet. If a negative ACK (NACK) is sent or the ACK is not successfully received, the UE may resend the SN=0 packet (0 here means retransmission).

The UE and the owner earbud may each maintain the owner counter for encrypted packets. When the UE transmits a packet, the counter at the UE is used to encrypt the payload of the packet, and a counter at the owner earbud is used to decrypt the payload of the encrypted packet. For example, the UE may transmit an SN=0 packet associated with a counter value x (e.g., x=100). The owner earbud would use a key and the x=100 to decrypt the SN=0 packet. If the SN=0 packet is successful, the UE may transmit an SN=1 packet encrypted with the key and x=101. The owner earbud may decrypt the SN=1 packet with the key and x=101. However, if the ACK for the SN=0 packet was lost, the UE may retransmit the SN=0 packet associated with x=100. The owner earbud will receive the SN=0 packet and try to decrypt the SN=0 packet with counter value x=101. Because the retransmitted packet is for x=100, this will result in an MIC error or a decryption error. Once an ACK is provided for the x=100 packet, the next packet will be x=101, which will match the current counter and will be decrypted successfully. However, there is an issue as to how the owner counter and the sniffer counter are to be aligned for successful decryption of the packets. This issue is addressed below.

In some aspects, the alignment of the counters may be based at least in part on the use of the nonce for the sniffer earbud. The sniffer earbud may use one of two decryption keys: a first key for a first counter value (SN=0 packet) and a second key for a second counter value (SN=1 packet). That is, depending on the SN, the sniffer earbud may use the appropriate key for the counter to decrypt the packet. For example, if the UE transmits an SN=0 packet (x=100), the owner earbud may receive the packet and transmit an ACK. The UE may receive the ACK and transmit an SN=1 packet. If the sniffer earbud misses the SN=0 packet, the sniffer counter at the sniffer earbud may remain at x=100 for SN=0. However, the owner earbud may receive the SN=1 packet with x=101 (owner earbud receives with owner counter x=101). In any case, the sniffer earbud may use either the first key for an SN=0 packet (counter x=100) or the second key for an SN=1 packet (counter x=101). The packet will be decrypted successfully without a decryption error or a CRC error.

Example 1300 shows a table of how received packets may be processed. A packet denoted as S(x), means its SN=S, and packet counter is x. Using a nonce, the sniffer earbud may set the nonce for the next two expected packets. For example, in scenario 1 (S No 1) for a received packet $\bar{s}$(SN=1 packet, as SN=0 packet was missed), if the CRC passes (last packet CRC octets match CRC octets of current packet) but the MIC fails, the received packet is considered to be $\bar{s}$(x+1) or $\bar{s}$(x−1) if the packet is a retransmission. The sniffer earbud may decrypt the packet using a key for $\bar{s}$(x+1). The expected packets (with counter values) may change. If the sniffer earbud is at a flushing point of s(x) (reached limited number of retransmissions for streamed packet), then the expected counter values may be $\bar{s}$(x+1) and s(x+2) or otherwise remain s(x) and $\bar{s}$(x+1). If CRC does not pass, the packet received may be considered to be x+3 and the expected counter values may change to s(x+4) and $\bar{s}$(x+5).

That is, the counter may be x−1 or x+3 based at least in part on the CRC (x−1 if CRC matches last packet).

In a second scenario (S No 2) for a received packet s (CRC passes, MIC fails), the received packet may be x=2 and the expected counter values may change to $\bar{s}(x+3)$ and $s(x+4)$. In a third scenario (S No 3) for a received packet $\bar{s}$ (CRC and MIC pass), the received packet may be $\bar{s}(x+1)$ such that decryption will pass (s packet was missed), and the expected counter values may change to $\bar{s}(x+2)$ and $\bar{s}(x+3)$. In a fourth scenario (S No 4) for a received packet s (CRC and MIC pass), the received packet may be $s(x)$, and the expected counter values may change to $\bar{s}(x+1)$ and $s(x+2)$. In S No 4, for example, if a single nonce is supported, the nonce corresponding to (x+1) is set. If a double nonce is supported, the nonce corresponding to (x+1) and (x+2) is set.

In a fifth scenario (S No 5) for a received packet s (CRC fail), the expected counter values may remain $s(x)$ and $\bar{s}(x+1)$. In a sixth scenario (S No 6) for a received packet s (CRC fail), the expected counter values may remain $s(x)$ and $\bar{s}(x+1)$. For scenarios 5 and 6, if the flushing point for $s(x)$ is reached, then the expected counter values may change to $\bar{s}(x+1)$ and $s(x+2)$.

In some aspects, with a receive synchronization packet (SYNC), in addition to the counter update as per the table, the sniffer earbud may update the sniffer counter to the next packet of the last packet received by the owner earbud (the last packet information is inferred from SYNC contents). There may be a blackout for a number of packets in an interval. If there is no sync-up in the interval, the sniffer earbud may ensure that the sniffer counter is one more than the packet that is corresponding to the last flushing point in the interval. In the case of a dynamic BN, the sniffer earbud may assume a minimum BN.

While examples are provided for audio packets, in some aspects, the examples may be applicable to video packets.

As indicated above, FIG. 13 is provided as an example. Other examples may differ from what is described with regard to FIG. 13.

FIG. 14 is a diagram illustrating an example process 1400 performed, for example, at a first peripheral device or an apparatus of a first peripheral device, in accordance with the present disclosure. Example process 1400 is an example where the apparatus or the first peripheral device (e.g., wireless communication device 200, sniffer earbud 1220) performs operations associated with techniques for stereo on peripheral devices.

As shown in FIG. 14, in some aspects, process 1400 may include receiving audio stream packets sniffed from an owner audio stream assigned to a second peripheral device paired with the first peripheral device (block 1410). For example, the first peripheral device (e.g., using reception component 1602 and/or communication manager 1606, depicted in FIG. 16) may receive audio stream packets sniffed from an owner audio stream assigned to a second peripheral device paired with the first peripheral device, as described above.

As further shown in FIG. 14, in some aspects, process 1400 may include receiving a synchronization message from the second peripheral device (block 1420). For example, the first peripheral device (e.g., using reception component 1602 and/or communication manager 1606, depicted in FIG. 16) may receive a synchronization message from the second peripheral device, as described above. The synchronization message may include an owner packet bitmap that identifies packets in the owner audio stream.

As further shown in FIG. 14, in some aspects, process 1400 may include identifying missed packets that the first peripheral device missed from the owner audio stream, based at least in part on a result of a comparison of the owner packet bitmap and a sniffer packet bitmap that identifies sniffed audio stream packets (block 1430). For example, the first peripheral device (e.g., using communication manager 1606, depicted in FIG. 16) may identify missed packets that the first peripheral device missed from the owner audio stream, based at least in part on a result of a comparison of the owner packet bitmap and a sniffer packet bitmap that identifies sniffed audio stream packets, as described above.

As further shown in FIG. 14, in some aspects, process 1400 may include transmitting a response message (block 1440). For example, the first peripheral device (e.g., using transmission component 1604 and/or communication manager 1606, depicted in FIG. 16) may transmit a response message, as described above. The response message may indicate the missed packets.

Process 1400 may include additional aspects, such as any single aspect or any combination of aspects described below and/or in connection with one or more other processes described elsewhere herein.

In a first aspect, process 1400 includes receiving the missed packets from the second peripheral device.

In a second aspect, alone or in combination with the first aspect, process 1400 includes transmitting one or more ACKs for the missed packets received from the second peripheral device.

In a third aspect, alone or in combination with one or more of the first and second aspects, process 1400 includes transmitting the sniffer packet bitmap, receiving, from the second peripheral device, a request for packets missed by the second peripheral device, and transmitting the packets missed by the second peripheral device.

In a fourth aspect, alone or in combination with one or more of the first through third aspects, receiving the missed packets is associated with a joint relay session where the first peripheral device and the second peripheral device relay missed packets in one or more subevents.

In a fifth aspect, alone or in combination with one or more of the first through fourth aspects, process 1400 includes triggering the receiving of the synchronization message.

In a sixth aspect, alone or in combination with one or more of the first through fifth aspects, the audio stream packets are encrypted, and receiving the audio stream packets includes, for each respective audio stream packet incrementing a counter for the respective audio stream packet, and decrypting the respective audio stream packet.

In a seventh aspect, alone or in combination with one or more of the first through sixth aspects, process 1400 includes maintaining the counter in association with a nonce that uses a first sequence number for a current packet and a second sequence number for a next packet.

In an eighth aspect, alone or in combination with one or more of the first through seventh aspects, process 1400 includes selecting a key from among a first key for a first counter value of the counter or a second key for a second counter value of the counter in accordance with a sequence number of the respective audio stream packet, and decrypting the respective audio stream packet includes decrypting the respective audio stream packet using the selected key.

In a ninth aspect, alone or in combination with one or more of the first through eighth aspects, the nonce may be a single nonce or a double nonce.

In a tenth aspect, alone or in combination with one or more of the first through ninth aspects, process 1400 includes selecting expected counter values for key selection based at least in part on whether the sequence number matches the second sequence number for the nonce and whether CRC information for the respective audio stream packet matches CRC information for a previous audio stream packet.

In an eleventh aspect, alone or in combination with one or more of the first through tenth aspects, process 1400 includes selecting expected counter values for key selection based at least in part on whether the sequence number matches the first sequence number for the nonce and whether a CRC passes for the respective audio stream packet and a MIC check fails for the respective audio stream packet.

In a twelfth aspect, alone or in combination with one or more of the first through eleventh aspects, process 1400 includes selecting expected counter values for key selection based at least in part on whether the sequence number matches the second sequence number for the nonce and whether a CRC passes for the respective audio stream packet and a MIC check passes for the respective audio stream packet.

In a thirteenth aspect, alone or in combination with one or more of the first through twelfth aspects, process 1400 includes selecting expected counter values for key selection based at least in part on whether the sequence number matches the first sequence number for the nonce and whether a CRC passes for the respective audio stream packet and a MIC check passes for the respective audio stream packet.

In a fourteenth aspect, alone or in combination with one or more of the first through thirteenth aspects, process 1400 includes selecting expected counter values for key selection based at least in part on whether the sequence number matches the first sequence number for the nonce and whether a cyclic redundancy check (CRC) fails for the respective audio stream packet.

In a fifteenth aspect, alone or in combination with one or more of the first through fourteenth aspects, process 1400 includes selecting expected counter values for key selection based at least in part on whether the sequence number matches the second sequence number for the nonce and whether a CRC fails for the respective audio stream packet.

In a sixteenth aspect, alone or in combination with one or more of the first through fifteenth aspects, process 1400 includes relaying packets to the second peripheral device with or in place of ACKs of packets relayed from the second peripheral device.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
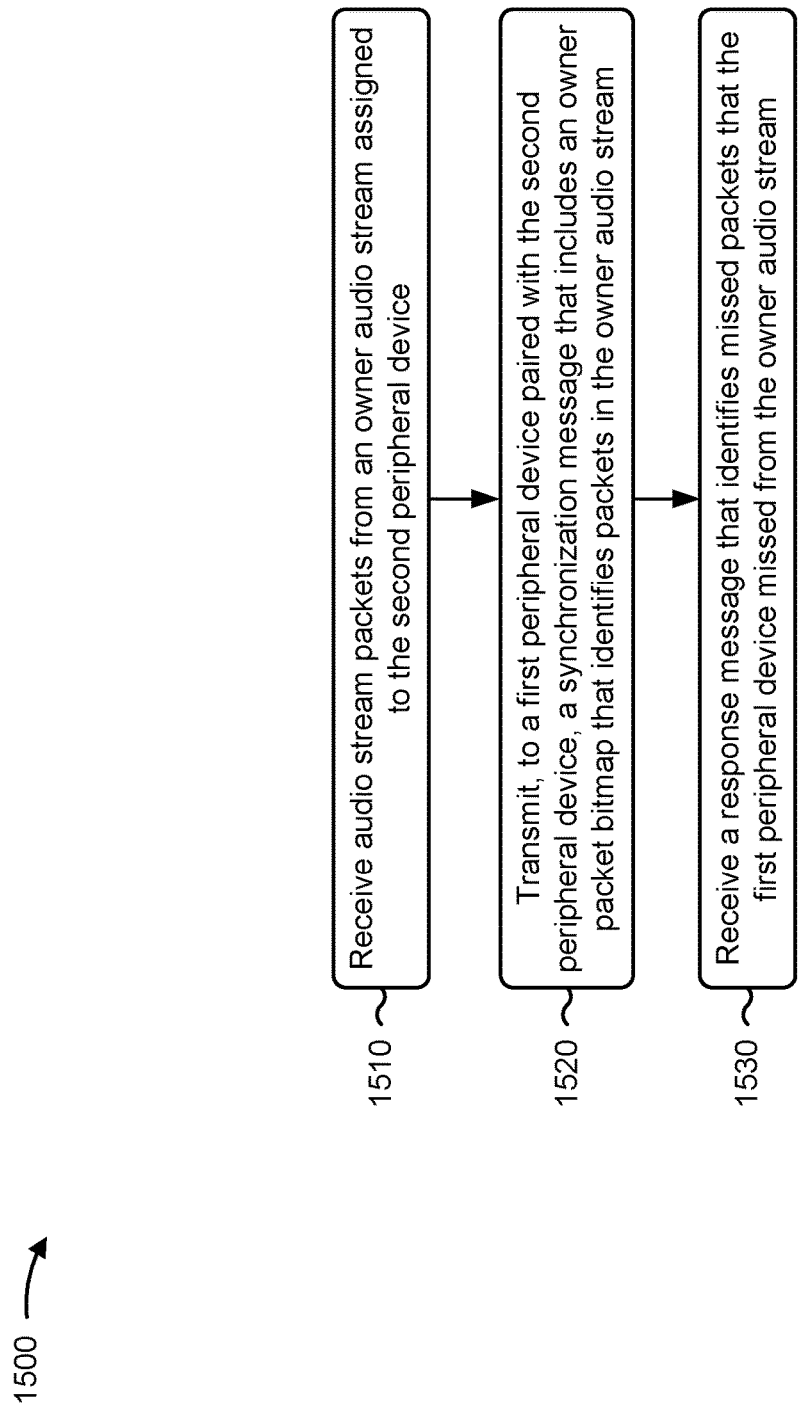
FIG. 15 is a diagram illustrating an example process performed, for example, at a second peripheral device or an apparatus of a second peripheral device, in accordance with the present disclosure.

FIG. 15 is a diagram illustrating an example process 1500 performed, for example, at a second peripheral device or an apparatus of a second peripheral device, in accordance with the present disclosure. Example process 1500 is an example where the apparatus or the second peripheral device (e.g., wireless communication device 200, owner earbud 1230) performs operations associated with techniques for stereo on peripheral devices.

As shown in FIG. 15, in some aspects, process 1500 may include receiving audio stream packets from an owner audio stream assigned to the second peripheral device (block 1510). For example, the second peripheral device (e.g., using reception component 1602 and/or communication manager 1606, depicted in FIG. 16) may receive audio stream packets from an owner audio stream assigned to the second peripheral device, as described above.

As further shown in FIG. 15, in some aspects, process 1500 may include transmitting, to a first peripheral device paired with the second peripheral device, a synchronization message that includes an owner packet bitmap that identifies packets in the owner audio stream (block 1520). For example, the second peripheral device (e.g., using transmission component 1604 and/or communication manager 1606, depicted in FIG. 16) may transmit, to a first peripheral device paired with the second peripheral device, a synchronization message that includes an owner packet bitmap that identifies packets in the owner audio stream, as described above.

As further shown in FIG. 15, in some aspects, process 1500 may include receiving a response message (block 1530). For example, the second peripheral device (e.g., using reception component 1602 and/or communication manager 1606, depicted in FIG. 16) may receive a response message, as described above. The response message may identify missed packets that the first peripheral device missed from the owner audio stream.

Process 1500 may include additional aspects, such as any single aspect or any combination of aspects described below and/or in connection with one or more other processes described elsewhere herein.

In a first aspect, transmitting the synchronization message includes transmitting the synchronization message an offset after one or more of a synchronization timeout, an out-of-transmission event, a determination that packets are no longer expected from a central device, or a determination that synchronization with the first peripheral device is expected.

In a second aspect, alone or in combination with the first aspect, process 1500 includes detecting the synchronization timeout or the out-of-transmission event based at least in part on a change in communication with a central device.

In a third aspect, alone or in combination with one or more of the first and second aspects, process 1500 includes generating the owner packet bitmap based at least in part on successfully received audio stream packets.

In a fourth aspect, alone or in combination with one or more of the first through third aspects, a size of the owner packet bitmap is based at least in part on a quantity of flushing points in a quantity of events.

In a fifth aspect, alone or in combination with one or more of the first through fourth aspects, process 1500 includes selecting information for header bits of relayed packets, the information indicating one or more of closure of a relay session, closure of another stream's relay session, or a next expected sequence number of a packet received in the other stream's relay session.

In a sixth aspect, alone or in combination with one or more of the first through fifth aspects, process 1500 includes transmitting the missed packets to the first peripheral device.

In a seventh aspect, alone or in combination with one or more of the first through sixth aspects, transmitting the missed packets includes transmitting the missed packets using subevents scheduled for an audio stream of the first peripheral device, based at least in part on an indication of a closure of a relay session for the audio stream of the first peripheral device.

In an eighth aspect, alone or in combination with one or more of the first through seventh aspects, subevents of the first peripheral device and subevents of the second peripheral device are both available for relay in an overlapped mode, and transmitting the missed packets includes transmitting the missed packets using available subevents among the subevents of the first peripheral device and the subevents of the second peripheral device.

In a ninth aspect, alone or in combination with one or more of the first through eighth aspects, transmitting the missed packets includes transmitting the missed packets based at least in part on a quantity of packets that are able to be relayed in an interval and flushing time information for the quantity of packets.

In a tenth aspect, alone or in combination with one or more of the first through ninth aspects, process 1500 includes receiving a sniffer packet bitmap that indicates the audio stream packets sniffed from the owner audio stream by the first peripheral device, identifying missed packets that the first peripheral device missed from the owner audio stream, based at least in part on a result of a comparison of the sniffer packet bitmap and an owner packet bitmap, and transmitting the missed packets to the first peripheral device.

In an eleventh aspect, alone or in combination with one or more of the first through tenth aspects, the owner packet bitmap includes a rate indicator indicating a rate of relay.

In a twelfth aspect, alone or in combination with one or more of the first through eleventh aspects, the owner packet bitmap indicates one or more of a starting interval or a starting point within an interval.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
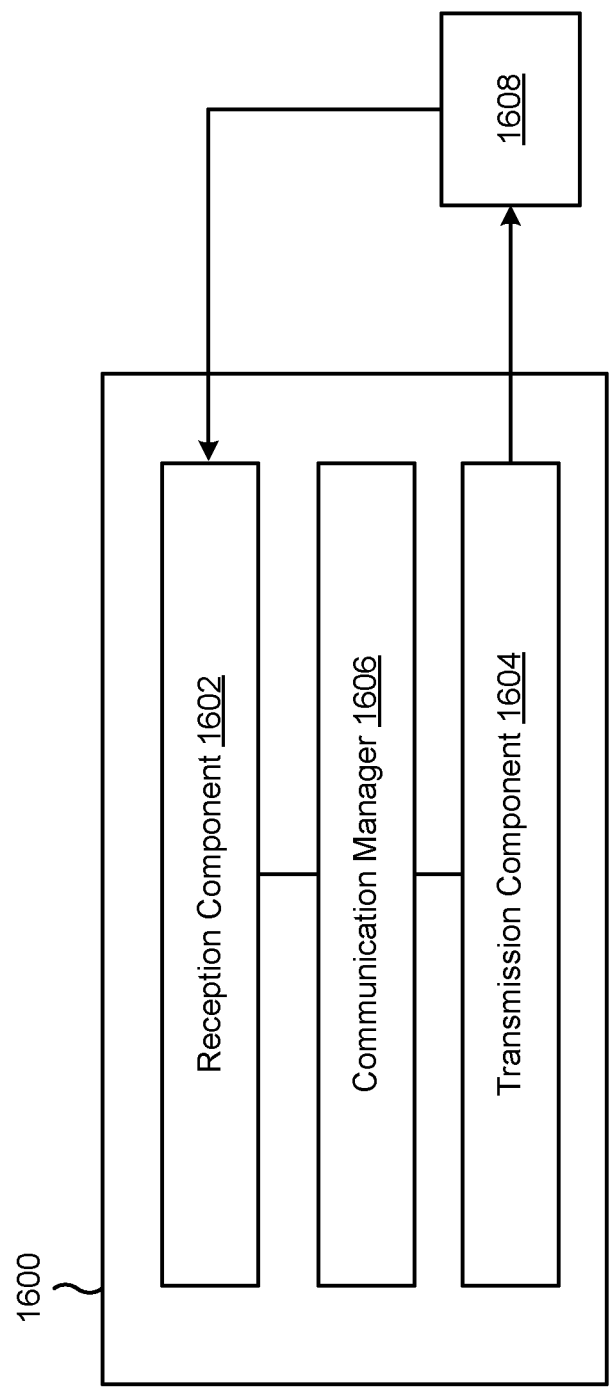
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a peripheral device, or a peripheral device may include the apparatus 1600. In some aspects, the apparatus 1600 includes a reception component 1602, a transmission component 1604, and/or a communication manager 1606, which may be in communication with one another (for example, via one or more buses and/or one or more other components). In some aspects, the communication manager 1606 is the WPAN controller 252 described in connection with FIG. 2. As shown, the apparatus 1600 may communicate with another apparatus 1608, such as a UE or another peripheral device, using the reception component 1602 and the transmission component 1604.

In some aspects, the apparatus 1600 may be configured to perform one or more operations described herein in connection with FIGS. 1-13. Additionally, or alternatively, the apparatus 1600 may be configured to perform one or more processes described herein, such as process 1400 of FIG. 14, process 1500 of FIG. 15, or a combination thereof. In some aspects, the apparatus 1600 and/or one or more components shown in FIG. 16 may include one or more components of the peripheral device described in connection with FIG. 2 and FIG. 5. Additionally, or alternatively, one or more components shown in FIG. 16 may be implemented within one or more components described in connection with FIG. 2 and FIG. 5. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1602 may receive communications, such as reference signals, control information, data communications, or a combination thereof, from the apparatus 1608. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, one or more modems, one or more demodulators, one or more receive processors, one or more controllers/processors, one or more memories, or a combination thereof, of the peripheral device described in connection with FIG. 2.

The transmission component 1604 may transmit communications, such as reference signals, control information, data communications, or a combination thereof, to the apparatus 1608. In some aspects, one or more other components of the apparatus 1600 may generate communications and may provide the generated communications to the transmission component 1604 for transmission to the apparatus 1608. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1604 may include one or more antennas, one or more modems, one or more modulators, one or more transmit processors, one or more controllers/processors, one or more memories, or a combination thereof, of the peripheral device described in connection with FIG. 2. In some aspects, the transmission component 1604 may be co-located with the reception component 1602 in one or more transceivers.

The communication manager 1606 may support operations of the reception component 1602 and/or the transmission component 1604. For example, the communication manager 1606 may receive information associated with configuring reception of communications by the reception component 1602 and/or transmission of communications by the transmission component 1604. Additionally, or alternatively, the communication manager 1606 may generate and/or provide control information to the reception component 1602 and/or the transmission component 1604 to control reception and/or transmission of communications.

In some aspects associated with a first peripheral device, the reception component 1602 may receive audio stream packets sniffed from an owner audio stream assigned to a second peripheral device paired with the first peripheral device. The reception component 1602 may receive a synchronization message from the second peripheral device that includes an owner packet bitmap that identifies packets in the owner audio stream. The communication manager 1606 may identify missed packets that the first peripheral device missed from the owner audio stream, based at least in part on a result of a comparison of the owner packet bitmap and a sniffer packet bitmap that identifies sniffed audio stream packets. The transmission component 1604 may transmit a response message indicating the missed packets.

The reception component 1602 may receive the missed packets from the second peripheral device. The transmission component 1604 may transmit one or more acknowledgements for the missed packets received from the second peripheral device.

The transmission component 1604 may transmit the sniffer packet bitmap. The reception component 1602 may receive, from the second peripheral device, a request for packets missed by the second peripheral device. The transmission component 1604 may transmit the packets missed by the second peripheral device. The communication manager 1606 may trigger the receiving of the synchronization message.

The communication manager 1606 may maintain the counter in association with a nonce that uses a first sequence number for a current packet and a second sequence number for a next packet. The communication manager 1606 may select a key from among a first key for a first counter value of the counter or a second key for a second counter value of the counter in accordance with a sequence number of the respective audio stream packet, and the communication manager 1606 may decrypt the respective audio stream packet using the selected key.

The communication manager 1606 may select expected counter values for key selection based at least in part on whether the sequence number matches the second sequence number for the nonce and whether CRC information for the respective audio stream packet matches CRC information for a previous audio stream packet.

The communication manager 1606 may select expected counter values for key selection based at least in part on whether the sequence number matches the first sequence number for the nonce and whether a CRC passes for the respective audio stream packet and a MIC check fails for the respective audio stream packet.

The communication manager 1606 may select expected counter values for key selection based at least in part on whether the sequence number matches the second sequence number for the nonce and whether a CRC passes for the respective audio stream packet and a MIC check passes for the respective audio stream packet.

The communication manager 1606 may select expected counter values for key selection based at least in part on whether the sequence number matches the first sequence number for the nonce and whether a CRC passes for the respective audio stream packet and a MIC check passes for the respective audio stream packet.

The communication manager 1606 may select expected counter values for key selection based at least in part on whether the sequence number matches the first sequence number for the nonce and whether a CRC fails for the respective audio stream packet. The communication manager 1606 may select expected counter values for key selection based at least in part on whether the sequence number matches the second sequence number for the nonce and whether a CRC fails for the respective audio stream packet.

The communication manager 1606 may relay packets to the second peripheral device with or in place of acknowledgements of packets relayed from the second peripheral device.

In some aspects associated with a second peripheral device, the reception component 1602 may receive audio stream packets from an owner audio stream assigned to the second peripheral device. The transmission component 1604 may transmit to a first peripheral device paired with the second peripheral device, a synchronization message that includes an owner packet bitmap that identifies packets in the owner audio stream. The reception component 1602 may receive a response message that identifies missed packets that the first peripheral device missed from the owner audio stream.

The communication manager 1606 may detect the synchronization timeout or the out-of-transmission event based at least in part on a change in communication with a central device. The communication manager 1606 may generate the owner packet bitmap based at least in part on successfully received audio stream packets.

The communication manager 1606 may select information for header bits of relayed packets, the information indicating one or more of closure of a relay session, closure of another stream's relay session, or a next expected sequence number of a packet received in the other stream's relay session.

The transmission component 1604 may transmit the missed packets to the first peripheral device. The reception component 1602 may receive a sniffer packet bitmap that indicates the audio stream packets sniffed from the owner audio stream by the first peripheral device. The communication manager 1606 may identify missed packets that the first peripheral device missed from the owner audio stream, based at least in part on a result of a comparison of the sniffer packet bitmap and an owner packet bitmap. The transmission component 1604 may transmit the missed packets to the first peripheral device.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a first peripheral device, comprising: receiving audio stream packets sniffed from an owner audio stream assigned to a second peripheral device paired with the first peripheral device; receiving a synchronization message from the second peripheral device that includes an owner packet bitmap that identifies packets in the owner audio stream; identifying missed packets that the first peripheral device missed from the owner audio stream, based at least in part on a result of a comparison of the owner packet bitmap and a sniffer packet bitmap that identifies sniffed audio stream packets; and transmitting a response message indicating the missed packets.

Aspect 2: The method of Aspect 1, further comprising receiving the missed packets from the second peripheral device.

Aspect 3: The method of Aspect 2, further comprising transmitting one or more acknowledgements for the missed packets received from the second peripheral device.

Aspect 4: The method of Aspect 2, further comprising, as part of a bidirectional relay session: transmitting the sniffer packet bitmap; receiving, from the second peripheral device, a request for packets missed by the second peripheral device; and transmitting the packets missed by the second peripheral device.

Aspect 5: The method of Aspect 2, wherein the receiving the missed packets is associated with a joint relay session where the first peripheral device and the second peripheral device relay missed packets in one or more subevents.

Aspect 6: The method of any of Aspects 1-5, further comprising triggering the receiving of the synchronization message.

Aspect 7: The method of any of Aspects 1-6, wherein the audio stream packets are encrypted, and wherein receiving the audio stream packets includes, for each respective audio stream packet: incrementing a counter for the respective audio stream packet; and decrypting the respective audio stream packet.

Aspect 8: The method of Aspect 7, further comprising maintaining the counter in association with a nonce that uses a first sequence number for a current packet and a second sequence number for a next packet.

Aspect 9: The method of Aspect 8, further comprising selecting a key from among a first key for a first counter value of the counter or a second key for a second counter value of the counter in accordance with a sequence number of the respective audio stream packet, and wherein decrypting the respective audio stream packet includes decrypting the respective audio stream packet using the selected key.

Aspect 10: The method of Aspect 9, wherein the nonce is a single nonce or a double nonce.

Aspect 11: The method of Aspect 9, further comprising selecting expected counter values for key selection based at least in part on whether the sequence number matches the second sequence number for the nonce and whether cyclic redundancy check (CRC) information for the respective audio stream packet matches CRC information for a previous audio stream packet.

Aspect 12: The method of Aspect 9, further comprising selecting expected counter values for key selection based at least in part on whether the sequence number matches the first sequence number for the nonce and whether a cyclic redundancy check (CRC) passes for the respective audio stream packet and a message integrity code (MIC) check fails for the respective audio stream packet.

Aspect 13: The method of Aspect 9, further comprising selecting expected counter values for key selection based at least in part on whether the sequence number matches the second sequence number for the nonce and whether a cyclic redundancy check (CRC) passes for the respective audio stream packet and a message integrity code (MIC) check passes for the respective audio stream packet.

Aspect 14: The method of Aspect 9, further comprising selecting expected counter values for key selection based at least in part on whether the sequence number matches the first sequence number for the nonce and whether a cyclic redundancy check (CRC) passes for the respective audio stream packet and a message integrity code (MIC) check passes for the respective audio stream packet.

Aspect 15: The method of Aspect 9, further comprising selecting expected counter values for key selection based at least in part on whether the sequence number matches the first sequence number for the nonce and whether a cyclic redundancy check (CRC) fails for the respective audio stream packet.

Aspect 16: The method of Aspect 9, further comprising selecting expected counter values for key selection based at least in part on whether the sequence number matches the second sequence number for the nonce and whether a cyclic redundancy check (CRC) fails for the respective audio stream packet.

Aspect 17: The method of any of Aspects 1-16, further comprising relaying packets to the second peripheral device with or in place of acknowledgements of packets relayed from the second peripheral device.

Aspect 18: A method of wireless communication performed by a second peripheral device, comprising: receiving audio stream packets from an owner audio stream assigned to the second peripheral device; transmitting, to a first peripheral device paired with the second peripheral device, a synchronization message that includes an owner packet bitmap that identifies packets in the owner audio stream; and receiving a response message that identifies missed packets that the first peripheral device missed from the owner audio stream.

Aspect 19: The method of Aspect 18, wherein transmitting the synchronization message includes transmitting the synchronization message an offset after one or more of a synchronization timeout, an out-of-transmission event, a determination that packets are no longer expected from a central device, or a determination that synchronization with the first peripheral device is expected.

Aspect 20: The method of Aspect 19, further comprising detecting the synchronization timeout or the out-of-transmission event based at least in part on a change in communication with a central device.

Aspect 21: The method of any of Aspects 18-20, further comprising generating the owner packet bitmap based at least in part on successfully received audio stream packets.

Aspect 22: The method of any of Aspects 18-21, wherein a size of the owner packet bitmap is based at least in part on a quantity of flushing points in a quantity of events.

Aspect 23: The method of any of Aspects 18-22, wherein the owner packet bitmap includes a rate indicator indicating a rate of relay.

Aspect 24: The method of any of Aspects 18-23, wherein the owner packet bitmap indicates one or more of a starting interval or a starting point within an interval.

Aspect 25: The method of any of Aspects 18-24, further comprising selecting information for header bits of relayed packets, the information indicating one or more of closure of a relay session, closure of another stream's relay session, or a next expected sequence number of a packet received in the other stream's relay session.

Aspect 26: The method of any of Aspects 18-25 further comprising transmitting the missed packets to the first peripheral device.

Aspect 27: The method of Aspect 26, wherein transmitting the missed packets includes transmitting the missed packets using subevents scheduled for an audio stream of the first peripheral device, based at least in part on an indication of a closure of a relay session for the audio stream of the first peripheral device.

Aspect 28: The method of Aspect 26, wherein subevents of the first peripheral device and subevents of the second peripheral device are both available for relay in an overlapped mode, and wherein transmitting the missed packets includes transmitting the missed packets using available subevents among the subevents of the first peripheral device and the subevents of the second peripheral device.

Aspect 29: The method of Aspect 26, wherein transmitting the missed packets includes transmitting the missed packets based at least in part on a quantity of packets that are able to be relayed in an interval and flushing time information for the quantity of packets.

Aspect 30: The method of any of Aspects 18-29, further comprising: receiving a sniffer packet bitmap that indicates the audio stream packets sniffed from the owner audio stream by the first peripheral device; identifying missed packets that the first peripheral device missed from the owner audio stream, based at least in part on a result of a comparison of the sniffer packet bitmap and an owner packet bitmap; and transmitting the missed packets to the first peripheral device.

Aspect 31: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-30.

Aspect 32: An apparatus for wireless communication at a device, the apparatus comprising one or more memories and one or more processors coupled to the one or more memories, the one or more processors configured to cause the device to perform the method of one or more of Aspects 1-30.

Aspect 33: An apparatus for wireless communication, the apparatus comprising at least one means for performing the method of one or more of Aspects 1-30.

Aspect 34: A non-transitory computer-readable medium storing code for wireless communication, the code comprising instructions executable by one or more processors to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

Aspect 36: A device for wireless communication, the device comprising a processing system that includes one or more processors and one or more memories coupled with the one or more processors, the processing system configured to cause the device to perform the method of one or more of Aspects 1-30.

Aspect 37: An apparatus for wireless communication at a device, the apparatus comprising one or more memories and one or more processors coupled to the one or more memories, the one or more processors individually or collectively configured to cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first peripheral device, comprising:
one or more memories; and
one or more processors, coupled to the one or more memories, individually or collectively configured to cause the first peripheral device to:
receive audio stream packets sniffed from an owner audio stream assigned to a second peripheral device paired with the first peripheral device;
receive a synchronization message from the second peripheral device that includes an owner packet bitmap that identifies packets in the owner audio stream;
identify missed packets that the first peripheral device missed from the owner audio stream, based at least in part on a result of a comparison of the owner packet bitmap and a sniffer packet bitmap that identifies sniffed audio stream packets;
transmit a response message indicating the missed packets;
wherein the audio stream packets are encrypted, and wherein to receive the audio stream packets, the one or more processors are individually or collectively configured to, for each respective audio stream packet;
  increment a counter for the respective audio stream packet; and
  decrypt the respective audio stream packet;
wherein the one or more processors are individually or collectively configured to cause the first peripheral device to maintain the counter in association with a nonce that uses a first sequence number for a current packet and a second sequence number for a next packet; and
wherein the one or more processors are individually or collectively configured to cause the first peripheral device to select a key from among a first key for a first counter value of the counter or a second key for a second counter value of the counter in accordance with a sequence number of the respective audio stream packet, and wherein the one or more processors, to decrypt the respective audio stream packet, are individually or collectively configured to decrypt the respective audio stream packet using the selected key.

2. The apparatus of claim 1, wherein the one or more processors are individually or collectively configured to cause the first peripheral device to receive the missed packets from the second peripheral device.

3. The apparatus of claim 2, wherein the one or more processors are individually or collectively configured to cause the first peripheral device to transmit one or more acknowledgements for the missed packets received from the second peripheral device.

4. The apparatus of claim 2, wherein the one or more processors are individually or collectively configured to cause the first peripheral device to, as part of a bidirectional relay session:
  transmit the sniffer packet bitmap;
  receive, from the second peripheral device, a request for packets missed by the second peripheral device; and
  transmit the packets missed by the second peripheral device.

5. The apparatus of claim 2, wherein reception of the missed packets is associated with a joint relay session where the first peripheral device and the second peripheral device relay missed packets in one or more subevents.

6. The apparatus of claim 1, wherein the one or more processors are individually or collectively configured to cause the first peripheral device to trigger the receiving of the synchronization message.

7. The apparatus of claim 1, wherein the one or more processors are individually or collectively configured to cause the first peripheral device to select expected counter values for key selection based at least in part on whether the sequence number matches the second sequence number for the nonce and whether cyclic redundancy check (CRC) information for the respective audio stream packet matches CRC information for a previous audio stream packet.

8. The apparatus of claim 1, wherein the one or more processors are individually or collectively configured to cause the first peripheral device to select expected counter values for key selection based at least in part on whether the sequence number matches the first sequence number for the nonce and whether a cyclic redundancy check (CRC) passes for the respective audio stream packet and a message integrity code (MIC) check fails for the respective audio stream packet.

9. The apparatus of claim 1, wherein the one or more processors are individually or collectively configured to cause the first peripheral device to select expected counter values for key selection based at least in part on whether the sequence number matches the second sequence number for the nonce and whether a cyclic redundancy check (CRC) passes for the respective audio stream packet and a message integrity code (MIC) check passes for the respective audio stream packet.

10. The apparatus of claim 1, wherein the one or more processors are individually or collectively configured to cause the first peripheral device to select expected counter values for key selection based at least in part on whether the sequence number matches the first sequence number for the nonce and whether a cyclic redundancy check (CRC) passes for the respective audio stream packet and a message integrity code (MIC) check passes for the respective audio stream packet.

11. The apparatus of claim 1, wherein the one or more processors are individually or collectively configured to cause the first peripheral device to select expected counter values for key selection based at least in part on whether the sequence number matches the first sequence number for the nonce and whether a cyclic redundancy check (CRC) fails for the respective audio stream packet.

12. The apparatus of claim 1, wherein the one or more processors are individually or collectively configured to cause the first peripheral device to select expected counter values for key selection based at least in part on whether the sequence number matches the second sequence number for the nonce and whether a cyclic redundancy check (CRC) fails for the respective audio stream packet.

13. The apparatus of claim 1, wherein the one or more processors are individually or collectively configured to cause the first peripheral device to relay packets to the second peripheral device with or in place of acknowledgements of packets relayed from the second peripheral device.

* * * * *